(12) United States Patent
Lundgren

(10) Patent No.: US 11,230,982 B2
(45) Date of Patent: Jan. 25, 2022

(54) METHOD FOR OPERATING AN INTERNAL COMBUSTION PISTON ENGINE

(71) Applicant: VOLVO TRUCK CORPORATION, Gothenburg (SE)

(72) Inventor: Staffan Lundgren, Hindås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/079,174

(22) PCT Filed: Mar. 9, 2017

(86) PCT No.: PCT/EP2017/055548
§ 371 (c)(1),
(2) Date: Aug. 23, 2018

(87) PCT Pub. No.: WO2017/153525
PCT Pub. Date: Sep. 14, 2017

(65) Prior Publication Data
US 2019/0048812 A1   Feb. 14, 2019

Related U.S. Application Data

(63) Continuation-in-part of application No. PCT/EP2016/055311, filed on Mar. 11, 2016.

(51) Int. Cl.
*F02B 75/02* (2006.01)
*F02D 41/00* (2006.01)
(Continued)

(52) U.S. Cl.
CPC ........ *F02D 41/0027* (2013.01); *F02B 75/021* (2013.01); *F02D 19/061* (2013.01);
(Continued)

(58) Field of Classification Search
CPC ...... F02B 75/021; F02B 1/12; F02D 19/0649; F02D 19/061; F02D 19/081;
(Continued)

(56) References Cited

U.S. PATENT DOCUMENTS

| 6,443,108 B1 | 9/2002 | Brehob et al. |
| 6,622,690 B2 * | 9/2003 | Ando .................. F02B 3/12 123/295 |

(Continued)

FOREIGN PATENT DOCUMENTS

| CN | 100379957 C | 4/2008 |
| CN | 101173626 A | 5/2008 |

(Continued)

OTHER PUBLICATIONS

English translation of the description of Tetsuo (JP 2010 229961).*

(Continued)

*Primary Examiner* — Gonzalo Laguarda
(74) *Attorney, Agent, or Firm* — Venable LLP; Jeffri A. Kaminski

(57) ABSTRACT

A method is provided for operating an internal combustion piston engine, including
introducing air into a cylinder of the engine,
compressing the air in a first compression stroke of the cylinder,
providing fuel into the cylinder for a first combustion, with a portion of the oxygen in the compressed air as oxidant, in a first power stroke succeeding the first compression stroke, to produce residues including oxygen,
compressing the residues in a second compression stroke succeeding the first power stroke, and
providing, after the first combustion, fuel into the cylinder for a second combustion, with at least a portion of the oxygen of the residues as oxidant, in a second power stroke succeeding the second compression stroke, (Continued)

wherein the first compression stroke is repealed immediately after the second power stroke, and the introduction of air into the cylinder is done at the end of the second power stroke and/or at the beginning of the first compression stroke.

20 Claims, 13 Drawing Sheets

(51) Int. Cl.
*F02D 19/08* (2006.01)
*F02D 19/06* (2006.01)
*F02B 1/12* (2006.01)
*F02D 13/02* (2006.01)

(52) U.S. Cl.
CPC ....... *F02D 19/0649* (2013.01); *F02D 19/081* (2013.01); *F02D 41/0025* (2013.01); *F02B 1/12* (2013.01); *F02D 13/0219* (2013.01); *F02D 19/0671* (2013.01); *F02D 19/0689* (2013.01); *F02D 19/0692* (2013.01); *F02D 2041/001* (2013.01); *Y02T 10/30* (2013.01)

(58) Field of Classification Search
CPC ............. F02D 19/0671; F02D 19/0689; F02D 19/0692; F02D 41/0025; F02D 41/0027; F02D 13/0219; F02D 2041/001; Y02T 10/36
USPC ............................................ 123/73 C, 73 PP
See application file for complete search history.

(56) References Cited

U.S. PATENT DOCUMENTS

| | | | |
|---|---|---|---|
| 6,966,309 | B1 | 11/2005 | Roberts et al. |
| 7,426,916 | B2 | 9/2008 | Reed et al. |
| 9,127,615 | B2* | 9/2015 | Fiveland ............... F02B 75/021 |
| 9,151,222 | B2* | 10/2015 | Svensson ............. F02B 75/021 |
| 2002/0000209 | A1 | 1/2002 | Ando et al. |
| 2004/0118557 | A1 | 6/2004 | Ancimer et al. |
| 2007/0044778 | A1* | 3/2007 | Milovanovic ........... F02B 21/00 123/568.14 |
| 2008/0098969 | A1* | 5/2008 | Reed .................. F02D 13/0215 123/64 |
| 2010/0269775 | A1 | 10/2010 | Chandes et al. |
| 2014/0158071 | A1* | 6/2014 | Svensson ................. F02B 3/06 123/64 |
| 2014/0158100 | A1* | 6/2014 | Williams ............ F02D 41/0052 123/568.21 |
| 2014/0338638 | A1 | 11/2014 | Rothe |

FOREIGN PATENT DOCUMENTS

| | | |
|---|---|---|
| CN | 101328831 A | 12/2008 |
| CN | 101363372 A | 2/2009 |
| CN | 101375036 A | 2/2009 |
| CN | 101387236 A | 3/2009 |
| CN | 102166311 A | 8/2011 |
| CN | 103233825 A | 8/2013 |
| CN | 103362636 A | 10/2013 |
| CN | 104005862 A | 8/2014 |
| CN | 104179604 A | 12/2014 |
| EP | 2476879 A1 | 7/2012 |
| GB | 2292586 A | 2/1996 |
| JP | H0533673 A | 2/1993 |
| JP | H10610694 A | 1/1994 |
| JP | H10610695 A | 1/1994 |
| JP | H10828295 A | 1/1996 |
| JP | 2001336435 A | 12/2001 |
| JP | 2010185440 A | 8/2010 |
| JP | 2010229961 A | 10/2010 |
| JP | 2010229961 A * | 10/2010 ............ F02B 75/021 |
| WO | 985108 A1 | 11/1998 |

OTHER PUBLICATIONS

International Search Report (May 29, 2017) for corresponding International App. PCT/EP2017/055548.
Tsunaki Hayasaki et al: "A Six-Stroke DI Diesel Engine Under Dual Fuel Operation". SAE Technical Papers, May 3, 1999 (May 3, 1999), XP055314753, Warrendale, USA DOI: 10.4271/1999-01-1500 Retrieved from the Internet: URL:https://saemobilus.sae.orgjcontent/1999-01-1500.
China Office Action dated Jan. 22, 2021 in corresponding China Patent Application No. 201780016342.4, 17 pages.

* cited by examiner

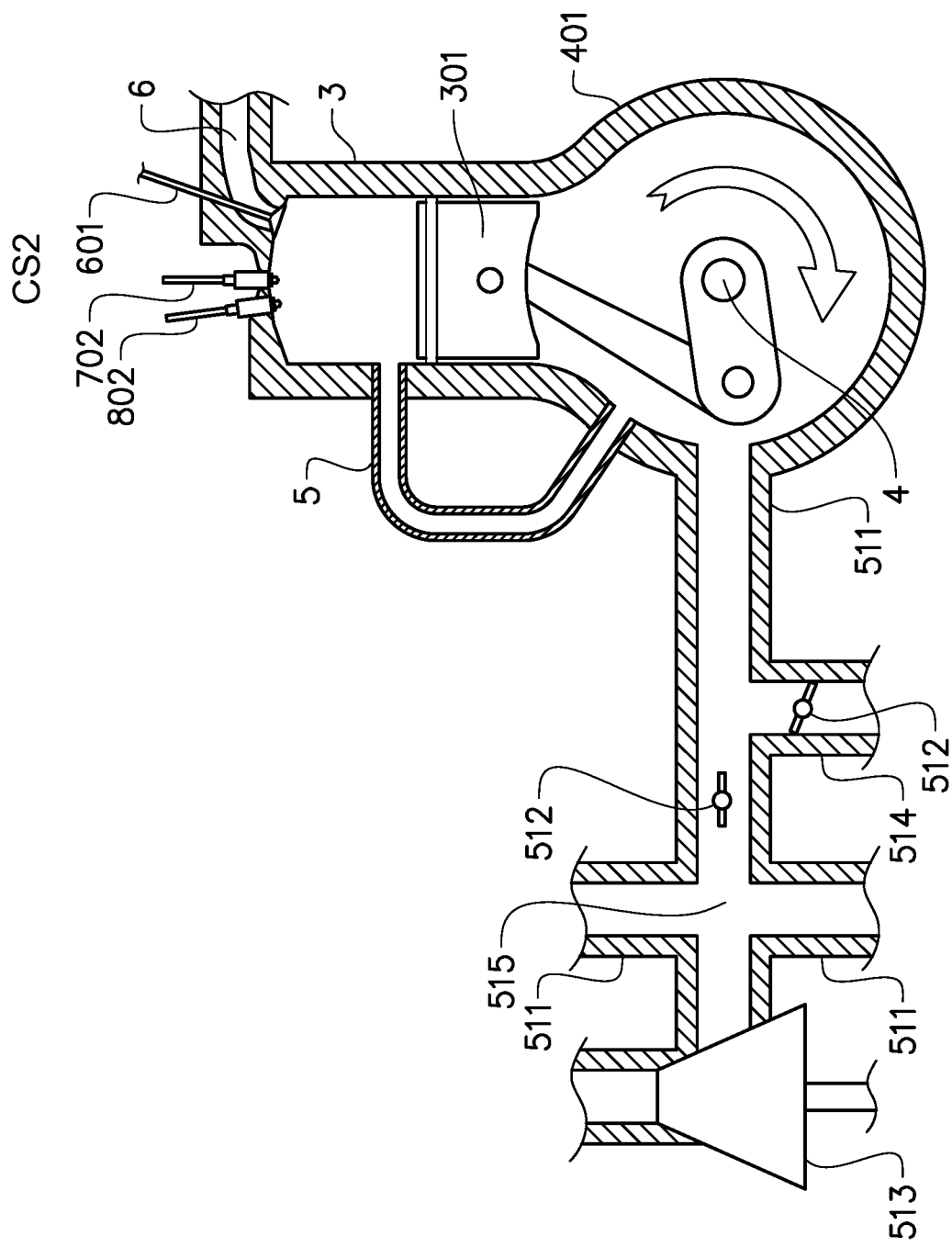

METHOD FOR OPERATING AN INTERNAL COMBUSTION PISTON ENGINE

BACKGROUND AND SUMMARY

The invention relates to a method for operating an internal combustion piston engine, a computer program, a computer readable medium, a control unit, an internal combustion engine system, an internal combustion engine, and a vehicle with such a system.

The invention can be applied in heavy-duty vehicles, such as trucks, buses and construction equipment. Although the invention will be described with respect to a truck, the invention is not restricted to this particular vehicle, but may also be used in other vehicles such as cars.

The attraction of diesel engines for heavy vehicles, due to the high efficiency and higher torque at low speeds presented by diesel engines, is well known. As emission control requirements on heavy vehicle diesel engines get stricter with time, many technical solutions have been suggested to reduce emissions.

An example can be found in the article "A Six-Stroke DI Diesel Engine Under Dual Fuel Operation", Hayasaki et al; SAE Technical Paper Series 1999-01-1500; International Spring Fuels & Lubricants Meeting & Exposition, Dearborn, Mich. May 3-6, 1999. It discloses a six-stroke diesel engine with first and second power strokes before the exhaust stroke. Diesel fuel is supplied for the first combustion process, and for the second combustion process, methanol is supplied. It is suggested that since methanol will form an oxidizing radical (OH) during combustion, it can reduce the soot produced in the first combustion process.

There is however, a desire to improve systems involving diesel engines, e.g. to reduce their size, weight and/or complexity.

It is desirable to allow for internal combustion engine systems to be simplified to reduce their size, weight and/or complexity, to allow for a reduction of the cost and complexity of internal combustion engine emission control systems, to reduce the size and/or the complexity of internal combustion engine systems, while retaining or improving the efficiency of the combustions therein and/or to provide an internal combustion engine running smoothly with cycles with two power strokes.

An aspect of the invention provides a method for operating an internal combustion piston engine, comprising introducing air into a cylinder of the engine, compressing the air in a first compression stroke of the cylinder, providing fuel into the cylinder for a first combustion, with a portion of the oxygen in the compressed air as oxidant, in a first power stroke succeeding the first compression stroke, to produce residues including oxygen, compressing the residues in a second compression stroke succeeding the first power stroke, and providing, after the first combust on, fuel into the cylinder for a second combustion, with at least a portion of the oxygen of the residues as oxidant, in a second power stroke succeeding the second compression stroke, wherein the first compression stroke is repeated immediately after the second power stroke, and the introduction of air into the cylinder is done at the end of the second power stroke and/or at the beginning of the first compression stroke.

It is understood that the first combustion will produce power to a crankshaft of the engine in the first power stroke, and that the second combustion will produce power to the crankshaft in the second power stroke.

Although particular advantages are provided where the first combustion is a diesel type combustion, as discussed below, the fuel provided for the first combustion may in some embodiments be provided for a premixed combustion, where the fuel may be injected directly into the cylinder or into air upstream of the cylinder, e.g. by port injection. Moreover, while the fuel provided for the second combustion, is, as described below, advantageously provided for a premixed combustion, in some embodiments it may be provided for a diesel type combustion. Where the fuel provided for the second combustion is provided for a premixed combustion, it may be injected directly into the cylinder or into air upstream of the cylinder, e.g. by port injection.

It is understood that the sequence of the first compression stroke, the first power stroke, the second combustion stroke and the second power strokes is continuously repeated during an operation of the engine. Preferably the first power stroke succeeds the first compression stroke immediately. Preferably the second compression stroke succeeds the first power stroke immediately. Preferably the second power stroke succeeds the second compression stroke immediately.

Since the first compression stroke is repeated immediately after the second power stroke, and the introduction of air into the cylinder is done at the end of the second power stroke and/or at the beginning of the first compression stroke, the engine may be similar to a 2-stroke engine. A scavenging process may be provided in the cylinder at the end of the second power stroke and/or at the beginning of the repeated first compression stroke. Thus, a cycle with four strokes in total, two of which are power strokes, may be provided. Such a four-stroke cycle with two combustions will provide an engine that runs more smoothly than an engine with a six-stroke cycle with two combustions. Also, an engine with a high power-to-weight ratio, having a greatly reduced number of moving parts compared to four-stroke engines, may be provided, so that the size of the engine may be decreased. Providing fuel into the cylinder for a first combustion, with a portion of the oxygen in the compressed air as oxidant, in a first power stroke succeeding the first compression stroke, to produce residues including oxygen, means that the first combustion is lean. The second combustion involving at least a portion of the oxygen of the residues as oxidant, may allow for a particularly advantageous cycles providing a greatly simplified exhaust after treatment system, as exemplified below.

Preferably, the method comprises preventing the introduction of air into the cylinder between the first and second combustions. Thereby, it may be secured that the second combustion involves as oxidant only what is provided by the residues. Thereby, an advantageous consumption of oxidant in the residues, as exemplified below, may be controlled in a secure manner. The engine may be a crankcase-scavenged engine wherein an intake guide is arranged to guide air to the cylinder from a crankcase of the engine, wherein an air conduit is arranged to guide air to the crankcase, wherein preventing the introduction of air into the cylinder between the first and second combustions comprises controlling flow control means for the air conduit to allow air to escape the crankcase during the first power stroke. The flow control means may comprise one or more control valves. Thereby, air introduced to the crankcase during the first compression may be pushed back through the air conduit during the first power stroke. Thereby, there will be no pressure build-up in the crankcase for air to be transported from the crankcase to the cylinder, via the intake guide, between the first and second combustions.

It should be noted that in some embodiments, the intake pressure could be produced by a blower or a compressor instead of crankcase pressure. In some embodiments, exemplified below, crankcase scavenging could be provided in combination with an air intake compressor.

Preferably, the fuel provided for the first combustion is injected into the air when at least a major portion of the first compression stroke has been completed. In such embodiments, the fuel provided for the first combustion is injected into the cylinder. The air may have been essentially maximally compressed in the first compression stroke when the fuel provided for the first combustion is injected, e.g. close to a top dead center (TDC) position of a piston in the cylinder. Thus, the first combustion may be provided by a compression ignition of a diesel cycle, i.e. the first combustion may be a diesel type combustion. Thereby, the fuel injection provides the first combustion in the form of a diffusion combustion.

Advantageously, the fuel provided for the first combustion is a first fuel and the fuel provided for the second combustion is a second fuel of a type which is different from that of the first fuel. The first fuel is advantageously diesel fuel or any other fuel suitable for the first combustion, as injected into the air when at least a major portion of the first compression stroke has been completed. The second fuel may be a fuel suitable for a premixed combustion, i.e. an Otto type combustion. Thereby, a particularly advantageous process of the engine may be provided, as exemplified below.

Modern diesel engine systems for heavy vehicles are typically equipped with selective catalytic reduction (SCR) based emission control systems. However, such systems are complex and include several catalyst components, such as an oxidation catalyst (DOC), a diesel particulate filter (DPF), a urea dosing system, a selective reduction catalyst as well as a clean-up oxidation catalyst. Such emission control systems are very bulky; the selective reduction catalyst alone requires a volume that is about three times the displacement volume of the engine. Also, the complexity of such a system is high. Its cost it typically constitutes about 30-40% of the total engine cost. There is therefore a desire to decrease the size of heavy vehicle diesel engine emission control systems. There is further a desire to reduce the cost and complexity of heavy vehicle diesel engine emission control systems. Another desire is to reduce the size and/or the complexity of heavy vehicle diesel engine emission control systems, while retaining or improving the efficiency of the diesel type combustion.

These desires may be met where the method comprises controlling the amount of fuel provided for the second combustion so as for the second combustion to be a stoichiometric combustion.

As mentioned, the first combustion is lean. Where the first combustion is a diesel type combustion, the first combustion may be a lean diesel type combustion with less concern for the exhaust after treatment process, compared to traditional diesel processes, and may be controlled for an optimized efficiency. The reason is that the amount of fuel injected for the second combustion may be the amount required for the second combustion to be a stoichiometric combustion. Thereby, the second combustion may consume substantially all remaining oxygen to provide a lambda value of 1 for the total cycle involving said strokes. In doing so the second combustion will consume soot as well as nitrogen oxides in the residues from the first combustion. This makes it possible to use a relatively simple and small three-way catalyst, as opposed to a complex, costly and large exhaust treatment unit, such as a selective catalytic reduction (SCR) unit, normally used for diesel engines.

Where the first combustion is a diesel type combustion, embodiments of the invention makes it possible to retard the timing of the ignition of the fuel for the first combustion to further improve the efficiency of a diesel type combustion. The reason is that the increased nitrogen oxides (NOx) formation and eventually soot formation provided by said retarded timing may be accepted, since a large fraction of this NOx and/or soot formation will be combusted as a result of the second combustion. Thereby, the emission out of the engine will not be affected negatively.

In summary, embodiments of the invention make it possible to considerably reduce the complexity of exhaust after treatment systems for diesel engines, while retaining or even improving the efficiency of the diesel combustion in the engines. As suggested, instead of diesel fuel, the first fuel could be provided as some other suitable diffusion combustion fuel, e.g. dimethyl ether (DME) or naphtha.

In addition, the second combustion will increase the engine out exhaust temperature, thereby reducing the risk of the exhaust temperature falling below a temperature interval for an efficient function of the exhaust after treatment system. Low exhaust temperatures may in known modern diesel engines be common due to a high level of refinement of the combustion process, and thereby cause problems with providing an efficient exhaust after treatment. The high exhaust temperature provided by embodiments of the invention is also beneficial for turbo compound and waste heat recovery solutions.

A method for operating an internal combustion piston engine according to an aspect of the invention is provided, comprising introducing air into a cylinder of the engine, compressing the air in a first compression stroke of the cylinder, injecting a first fuel into the cylinder, allowing a first combustion of the injected first fuel with a portion of the oxygen in the compressed air as oxidant, to produce power to a crankshaft of the engine in a first power stroke succeeding the first compression stroke, and to produce residues including oxygen, and compressing the residues in a second compression stroke succeeding the first power stroke, the method further comprising injecting into the cylinder a second fuel of a type which is different from that of the first fuel, and allowing a second combustion of the second fuel with the oxygen of the residues as oxidant to produce power to the crankshaft of the engine in a second power stroke succeeding the second compression stroke, and by controlling the amount of second fuel injected in the step of injecting the second fuel so as for the second combustion to be a stoichiometric combustion.

It is understood that in most embodiments, the first power stroke immediately succeeds the first compression stroke, the second compression stroke immediately succeeds the first power stroke, and the second power stroke immediately succeeds the second compression stroke. Some embodiments of the method may involve operating the engine in a six-stroke mode with a sequence of an intake stroke, the first compression stroke, the first power stroke, the second compression stroke, the second power stroke, and an exhaust stroke.

Similarly to what has been suggested above, injecting into the cylinder a second fuel of a type which is different from that of the first fuel, and allowing a second combustion, provided by a, of the second fuel with the oxygen of the residues from the first combustion as oxidant provides the following important advantages:

A lean ratio of the amount of air compressed in the first compression stroke and the amount of first fuel injected may be provided. More specifically, it is possible to provide the first fuel as diesel fuel or some other suitable fuel for an injection forming a diffusion combustion, whereby an effective lean diesel type combustion is provided. As suggested above, the lean diesel type combustion may be used with less concern for the exhaust after treatment process, compared to traditional diesel, and may be controlled for an optimized efficiency, and it is possible to use a relatively simple and small three-way catalyst.

Again, it should be noted that instead of diesel fuel, the first fuel could be provided as some other suitable diffusion combustion fuel, e.g. dimethyl ether (DME) or naphtha. Again, the second combustion will advantageously increase the engine out exhaust temperature.

As mentioned, the fuel provided for the first combustion, i.e. the first fuel, is injected into the air when at least a major portion of the first compression stroke has been completed. Thereby, the first combustion is provided by a compression ignition. As also suggested, the injection of the first fuel may provide the first combustion in the form of a diffusion combustion. The injection of the first fuel may be provided at the end of the first compression stroke or at the beginning of the first power stroke, preferably shortly before the top dead center (TDC) position. Thereby, providing the first combustion in the form of a diffusion combustion may be secured.

It should be noted that embodiments of the invention may be applied to engines with any number of cylinders, e.g. one, two, three, four, five, six, eight or twelve cylinders, in any configuration, e.g. an inline configuration or a V-configuration.

Preferably, where the first fuel is diesel fuel, the method comprises by supplying the diesel fuel for the injection thereof from a container, and reforming diesel fuel from the container to produce the second fuel in the form of a high octane fuel, e.g. in the form of a gas with a mix of carbon monoxide and hydrogen. The reforming may be a catalytic decomposition process converting the diesel fuel to the high octane gaseous fuel. Thereby, in a vehicle application, the reforming provides an onboard fuel conversion function whereby the vehicle may be refueled with a single fuel type during operations.

Preferably, the method comprises controlling the temperature of the residues by controlling the timing of the injection of the first fuel, and/or by controlling the amount of the first fuel injected at the injection of the first fuel. Thereby, the temperature of the residues from the first combustion can be controlled, e.g. to avoid pre-ignition of a mix of the residues and the second fuel in the second combustion stroke.

Similarly to what has been suggested above, the second combustion may be provided on a premix of the second fuel with the oxygen of the residues as oxidant. Thereby, the second combustion is an Otto type combustion. I.e. the second combustion preferably provides a premixed flame, i.e. a flame in which the oxidant, (which may also be referred to as an oxidizer), has been mixed with the fuel before it reaches the flame front. The second combustion may advantageously be provided by a Homogenous Charge Ignition. The second combustion may be provided by a Homogenous Charge Compression ignition (HCCI), or a partially Homogenous Charge Compression Ignition (pHCCI). Thereby the engine does not need to be provided with spark-plugs. However, it is also possible for the Homogenous Charge Ignition to be a Homogenous Charge Spark Ignition.

The second fuel is suitably a high octane fuel. The second fuel preferably has a Research Octane Number (RON) of at least 80, preferably at least 92, and more preferably at least 95. Thereby, the second combustion on a premix of the second fuel with the oxygen of the residues as oxidant may be secured with a reduced risk of premature ignition.

Preferably, the injection of the second fuel is provided at the end of the first power stroke or in the second compression stroke. Advantageously, the injection of the second fuel is provided at the end of the first power stroke or at the beginning of the second compression stroke. The injection of the second fuel may be provided before 90 crankshaft degrees before the top dead center (TDC) position at the end of the second compression stroke. The injection of the second fuel may even be injected before the bottom dead center position at the end of the first power stroke. However, preferably, the second fuel is injected after the bottom dead center (BDC) position at the beginning of the second compression stroke. Thereby a homogenous mix of the second fuel with the residues from the first combustion may be secured.

Preferably, the method comprises determining an amount of oxygen in exhaust gases produced by the second combustion, and determining, based on the determined amount of oxygen an amount of second fuel, whereby the amount of second fuel injected is said determined amount. Thereby, it is possible to adjust the amount of second fuel to secure that it is the amount required for the second combustion to be a stoichiometric combustion. The determination of the amount of oxygen may be done by determining any quality of the exhaust gases indicative of the oxygen content therein or the lambda value of the second combustion. The determination of the amount of oxygen may be done by means of a suitable sensor, such as a lambda sensor, e.g. an oxygen sensor, or some other kind of sensor providing signals based on which the lambda value of the second combustion may be determined. Such a sensor may be located in an exhaust guide arranged to guide gases from the cylinder. The sensor may be adapted to measure the proportion of oxygen in exhaust gases in the exhaust guide, in the form of dioxygen or as part of a compound, e.g. a nitrogen oxide. The sensor may in some embodiments be arranged to use Fourier transform infrared spectroscopy (FTIR) and/or it may be arranged to detect the concentration of carbon dioxide in the exhaust gases, from which the lambda value of the second combustion may be determined. The result of such a control of the amount of second fuel for the injections may be lambda values at the second combustions that oscillate somewhat around 1. However, the mean value of the lambda values is preferably 1.

In alternative embodiments, a control of the amount of second fuel injected so as for the second combustion to be a stoichiometric combustion, may be done based on stored data regarding the engine. Thereby, determining the amount of oxygen in the exhaust gases, i.e. determining the lambda value of the second combustion, may be done based on other operational parameters and stored data. Such stored data may form a "virtual engine" allowing the fuel amount to be determined based on one or more operational parameter values, without any sensor in the exhaust guide.

The method preferably involves expelling exhaust gases produced by the second combustion from the cylinder, and allowing the exhaust gases to be guided to a three-way catalyst. As stated, the three-way catalyst may replace, and is a considerably less space consuming, complex and costly than a selective catalytic reduction unit. In embodiments with a six-stroke cycle, the exhaust gases produced by the second combustion may be expelled from the cylinder during an exhaust stroke succeeding the second power stroke. In embodiments with a four-stroke cycle, as described above, the exhaust gases produced by the second combustion may be expelled from the cylinder during a scavenging process at the end of the second power stroke and/or at the beginning of the repeated first compression stroke.

Said oxygen in the residues may be at least partly provided as a part of nitrogen oxide in the residues. As also pointed out above, the second combustion may, in addition to dioxygen, use the oxygen in the nitrogen oxide produced by first combustion, whereby the nitrogen oxide production of the engine is reduced.

Preferably, the method comprises providing a compression ratio of the second compression stroke which is lower than a compression ratio of the first compression stroke. Where the engine comprises an intake guide for guiding air to the cylinder, an exhaust guide for guiding gases from the cylinder, and a valve for controlling a communication between the cylinder and the exhaust guide or the intake guide, the method may comprise providing said compression ratio difference by providing an overlap of an opening sequence of the valve and the second compression stroke. Preferably, the method comprises adjusting the compression ratio of the second compression stroke. Such an adjustment may be provided by adjusting the overlap of the opening sequence of said valve and the second compression stroke. Where the engine comprises a camshaft with a cam lobe for actuating the valve, the method may comprise adjusting the overlap by cam phasing of the camshaft. However, other manners of adjusting the valve timing may be used, such as cam switching or actuation with electrically direct or indirect valve control.

Thereby, the overlap of the opening sequence of the valve and the second compression stroke provides an adjustable bleed function, winch in turn adjusts the compression ratio of the second compression stroke. In embodiments where the ignition of the second fuel is provided by HCCI or a partially Homogenous Charge Compression Ignition (pHCCI), the adjustment of the bleed function, in turn adjusting the compression ratio of the second compression stroke, can be made to provide an optimal timing of the HCCI or pHCCI event. Also, in embodiments with any suitable type of ignition of the second fuel, the adjustment of the compression ratio of the second compression stroke may be used for engine load and speed control. Thus, the method may comprise determining a requested load of the engine, the adjustment of said compression ratio being at least partly based on the requested engine load.

Some embodiments provide an extremely rapid cold start process of an exhaust after treatment unit of the engine system, e.g. a three-way catalyst. Where the engine comprises an exhaust guide arranged to guide gases from the cylinder to an exhaust treatment device, the method may comprise determining a requested load of the engine, determining a temperature of the exhaust treatment device, and determining based on the determined temperature whether to operate the engine at the requested load in a first mode or a second mode, the amount of first fuel provided, e.g. injected, for the first combustion feeing smaller in the second mode than in the first mode, and/or the amount of second fuel provided, e.g. injected, for the second combustion being larger in the second mode than in the first mode. Where the engine is provided with a valve for controlling a communication between the cylinder and the exhaust guide, the method may comprise controlling an overlap of an opening sequence of the valve and the second power stroke to be larger in the second mode than in the first mode. Where the engine comprises a camshaft with a cam lobe for actuating the valve, the method may comprise controlling the overlap by cam phasing of the camshaft. However, other manners of adjusting the valve timing may be used, such as cam switching or actuation with electrically direct or indirect valve control.

By the decreased amount of first fuel in the first combustion, the oxygen in the residues from the first combustion will increase. The increased amount of fuel in the second combustion mixed with said increased amount of oxygen will provide for more energy being released by the second combustion in the second mode compared to the first mode. In addition, the increased overlap of said opening sequence and the second power stroke will allow the combustion process to continue in the exhaust guide and thereby increase the temperature in the three-way catalyst. Thereby, the second fuel is used to provide additional power and torque as well as increasing the exhaust temperature.

According to an aspect of the invention, an internal combustion engine system is provided comprising a cylinder with a piston connected to a crankshaft, an intake guide, e.g. of an intake manifold, arranged to guide air to the cylinder, an exhaust guide arranged to guide gases from the cylinder, a first container, a first injector arranged to inject a first fuel supplied from the first container into the cylinder, a second container, and a second injector arranged to inject a second fuel supplied from the second container into the cylinder, the system being arranged to pro vide a cycle, e.g. a tour-stroke cycle, or a six-stroke cycle, with a sequence of a first compression stroke, a first power stroke, a second compression stroke and a second power stroke, wherein the system comprises a three-way catalyst, the exhaust guide being arranged to guide gases from the cylinder to the three-way catalyst. As suggested above, a spark plug may or may not be arranged to ignite a mix of fuel and oxygen in the cylinder.

Preferably, the system is arranged for the second fuel being of a type that is different from that of the first fuel. Preferably, the cylinder is arranged to compress the air from the intake guide in the first compression stroke of the cylinder, the first injector being adapted for injecting the first fuel into the air at a top dead center (TDC) position of the piston at the end of the first compression stroke. Thus, the first injector is adapted for providing a pressure which is high enough for injecting the first fuel for a compression ignition for a diesel type combustion. There, the engine system allows for a first combustion in the form of a diffusion combustion of injected first fuel with a portion of the oxygen in compressed air in the cylinder, to produce residues including oxygen, and to allow a second combustion on a premix of injected second fuel with the oxygen of the residues as oxidant. Similarly to embodiments of the method described above, the engine system provides, by allowing a diesel type combustion with a the three-way catalyst, a considerably reduced size and complexity of the exhaust after treatment systems for a diesel engine, while retaining or even improving the efficiency of the diesel combustion in the engine.

Preferably, the system comprises means determining an amount of oxygen in exhaust gases produced by the second combustion. Thereby, it is possible to determine based on the determined amount of oxygen an amount of second fuel, whereby the amount of second fuel injected is said determined amount. The means for determining an amount of oxygen may comprise any suitable sensor as exemplified above, e.g. a lambda sensor. The sensor may be located in the exhaust guide. Thereby a control unit may be arranged to receive signals from the lambda sensor as exemplified below. As stated, in alternative embodiments, the control of the amount of second fuel injected so as for the second combustion to be a stoichiometric combustion, may be done based on stored data regarding the engine.

Preferably, the system comprises an intake valve and an exhaust valve arranged to control a communication between the cylinder and the intake guide and a communication between the cylinder and the exhaust guide, respectively, the system further comprising a valve actuation assembly arranged to adjust an overlap of an opening sequence of the intake valve and/or the exhaust valve and the second compression stroke. Preferably, the valve actuation assembly comprises at least one camshaft with an intake cam lobe for actuating the intake valve and an exhaust cam lobe for actuating the exhaust valve, the camshaft being arranged to rotate at a speed being half, e.g. for a four stroke cycle, or a third, e.g. for a six-stroke cycle, of the rotational speed of the crankshaft, the camshaft being arranged for a cam phasing function, the intake cam lobe and/or the exhaust cam lobe being provided with a nose for providing the opening sequence of the intake valve and/or the exhaust valve, respectively, whereby the cam phasing function is arranged to adjust the overlap of the opening sequence and the second compression stroke. However, the valve actuation assembly may comprise some other means for adjusting the valve timing, such as cam switching or actuation with electrically direct or indirect valve control.

Similarly to some embodiments of the method described above, the overlap of the opening sequence of the valve and the second compression stroke provides an adjustable bleed function, which in turn adjusts the compression ratio of the second compression stroke. This may be used to provide an optimal timing of HCCI or pHCCI events providing the second combustion, and/or it may be used for engine load and speed control.

Preferably, the system further comprises an exhaust valve arranged to control a communication between the cylinder and the exhaust guide, and a valve actuation assembly arranged to adjust an overlap of an opening sequence of the exhaust valve, and the second power stroke. Preferably, the valve actuation assembly comprises at least one camshaft with an exhaust cam lobe for actuating the exhaust valve, the camshaft being arranged to rotate at a speed being half, e.g. for a four stroke cycle, or a third, e.g. for a six-stroke cycle, of the rotational speed of the crankshaft, the camshaft being arranged for a cam phasing function, the exhaust cam lobe being provided with a nose for providing the opening sequence of the exhaust valve, whereby the cam phasing function is arranged to adjust the overlap of the opening sequence and the second power stroke. However, the valve actuation assembly may comprise some other means for adjusting the valve timing, such as cam switching or actuation with electrically direct or indirect valve control.

Similarly to embodiments of the method described above, this makes it possible to increase the overlap of the opening sequence and the second power stroke to allow the second combustion process to continue in the exhaust guide and thereby increase the temperature in the three-way catalyst.

In some embodiments, where the first fuel is diesel fuel, the system comprises a fuel reforming assembly arranged to crack the diesel fuel from the first container to produce the second fuel in the form of a high octane fuel, the second container being arranged to receive the high octane fuel from the fuel reforming assembly. As suggested above, thereby, in a vehicle application, the reforming provides an onboard fuel conversion function whereby the vehicle may be refueled with a single fuel type during operations.

According to an aspect of the invention, an internal combustion engine is provided comprising a cylinder with a piston connected to a crankshaft, an intake guide arranged to guide air to the cylinder, an exhaust guide arranged to guide gases from the cylinder, the engine being arranged to repetitively provide a cycle with a sequence of a first compression stroke, a first power stroke with a first combustion, a second compression stroke and a second power stroke with a second combustion, characterized in that the engine is arranged for the first compression stroke to be repeated immediately after the second power stroke, that the engine is arranged for the introduction of air from the intake guide into the cylinder at the end of the second power stroke and/or at the beginning of the first compression stroke, and that the engine comprises means for preventing the introduction of air into the cylinder between the first and second combustions.

Similarly to what has been discussed above, since the engine is arranged for the first compression stroke to be repeated immediately after the second power stroke, and the engine is arranged for the introduction of air from the intake guide into the cylinder at the end of the second power stroke and/or at the beginning of the first compression stroke, the engine may be similar to a 2-stroke engine. The engine may be arranged to provide a scavenging process in the cylinder at the end of the second power stroke and/or at the beginning of the repeated first compression stroke. Thereby, a cycle with four strokes in total, two of which are power strokes, may be provided, and the engine may be provided with a high power-to-weight ratio, having a greatly reduced number of moving parts compared to four-stroke engines, so that the size of the engine may be decreased.

Preferably, the engine is a crankcase-scavenged engine wherein the intake guide is arranged to guide air to the cylinder from a crankcase housing the crankshaft, wherein an air conduit is arranged to guide air to the crankcase, wherein the means for preventing the introduction of air into the cylinder between the first and second combustions comprises a control valve in the air conduit. Similarly to what has been discussed above, thereby, it may be secured that the second combustion involves as oxidant only what is provided by the residues.

The engine may comprise a first injector arranged to inject fuel into the cylinder for the first combustion, and a second it arranged to inject fuel into the cylinder for the second combustion.

Further advantages and advantageous features of embodiments of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 9a-9d depict a cross-section of a cylinder in an engine according to a further embodiment of the invention, where each of FIG. 9a-9d shows the cylinder in a respective stroke of a repeated cycle of the cylinder.

DETAILED DESCRIPTION

Figure 1:
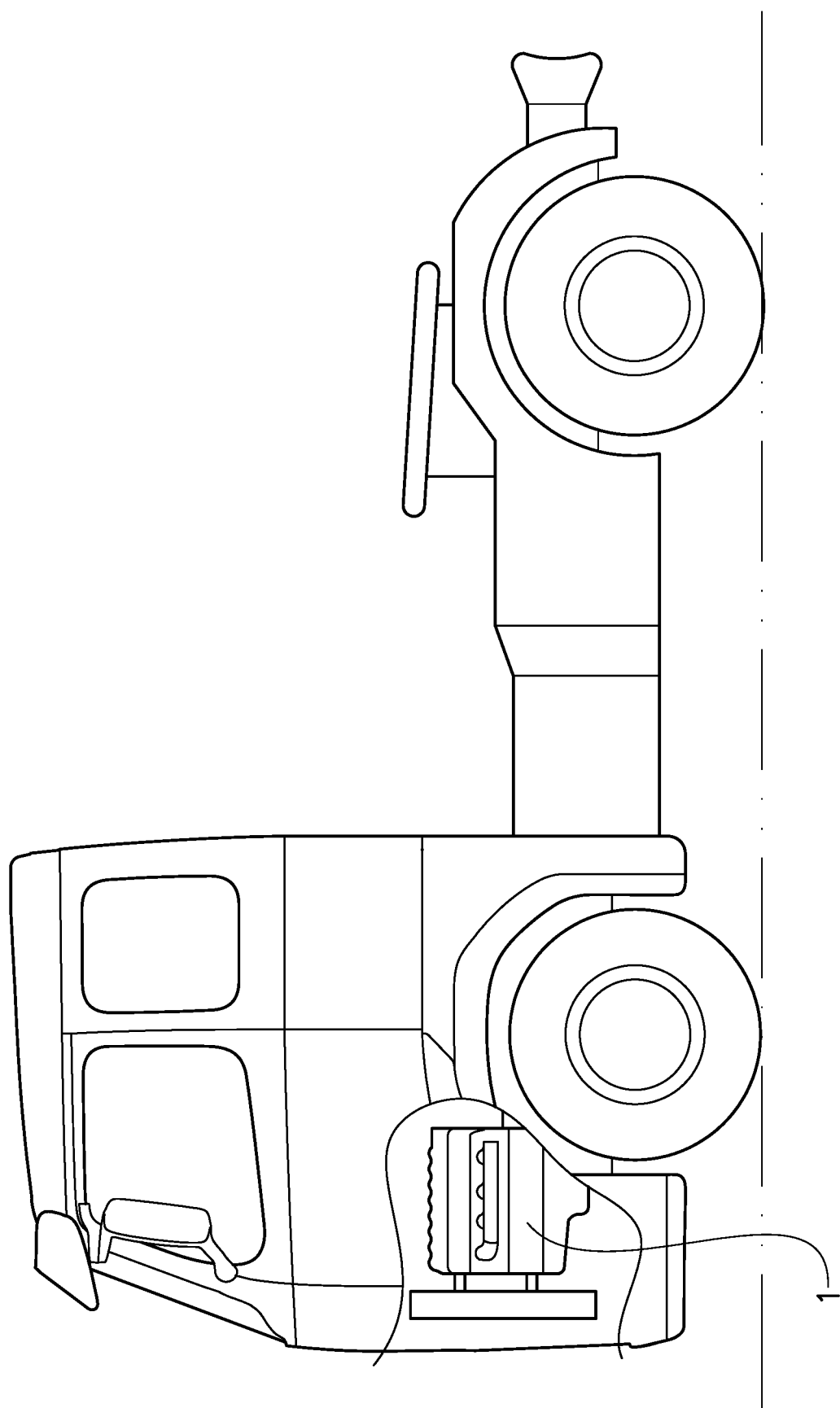
FIG. 1 is a side view of a vehicle in the form of a truck.

FIG. 1 shows a vehicle in the form of a truck, or a tractor for a semitrailer. It should be noted that the vehicle can be of a variety of alternative types, e.g. it may be a car, a bus, or a working machine such as a wheel loader. The vehicle comprises an internal combustion system with an internal combustion engine 1, which in this example is a six-stroke diesel engine, described closer below.

Figure 2:
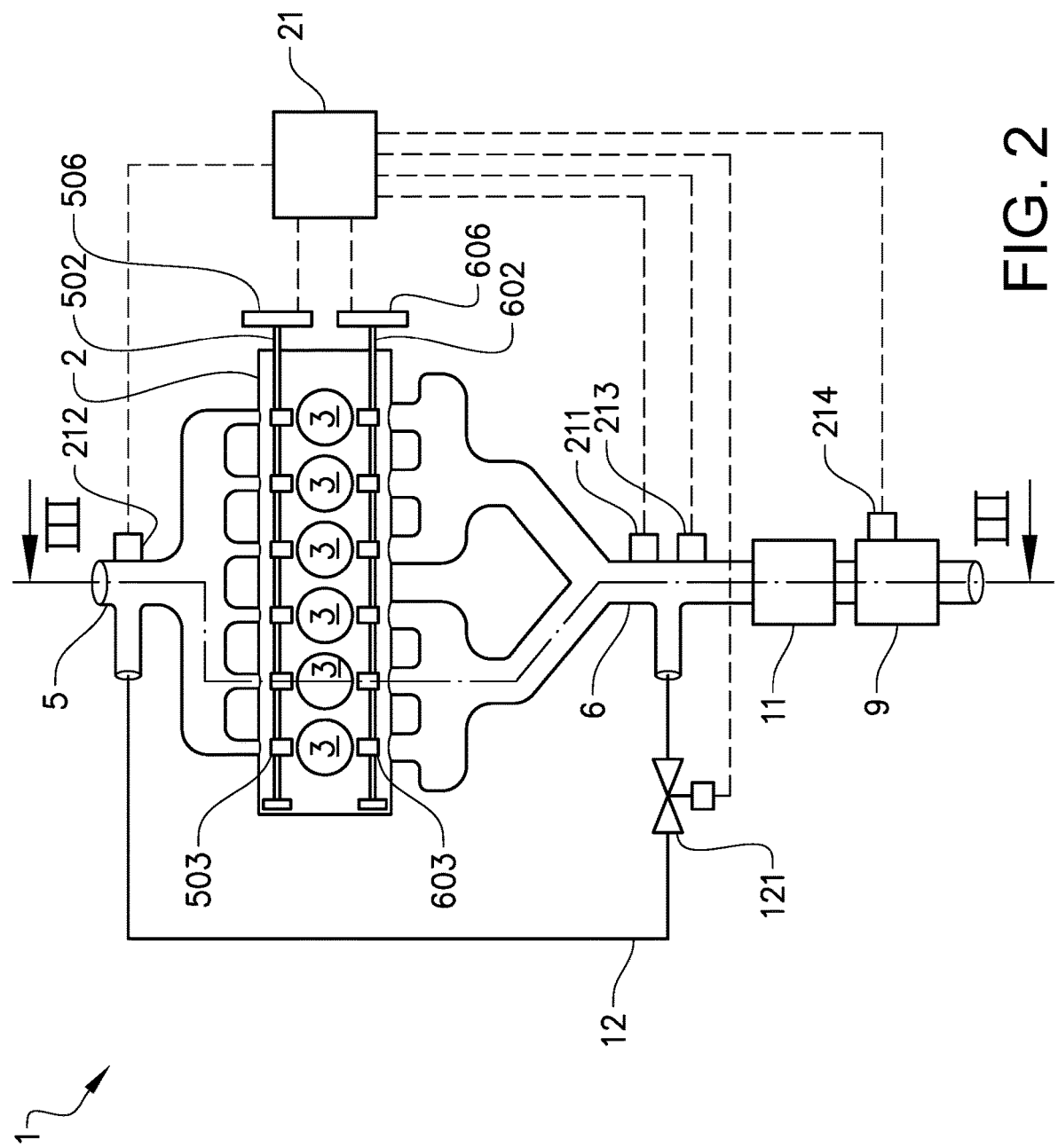
FIG. 2 shows part of an internal combustion engine system in the vehicle in FIG. 1.

As can be seen in FIG. 2, the engine 1 in the engine system in this example comprises six cylinders 3 in an in-line arrangement.

Figure 3:
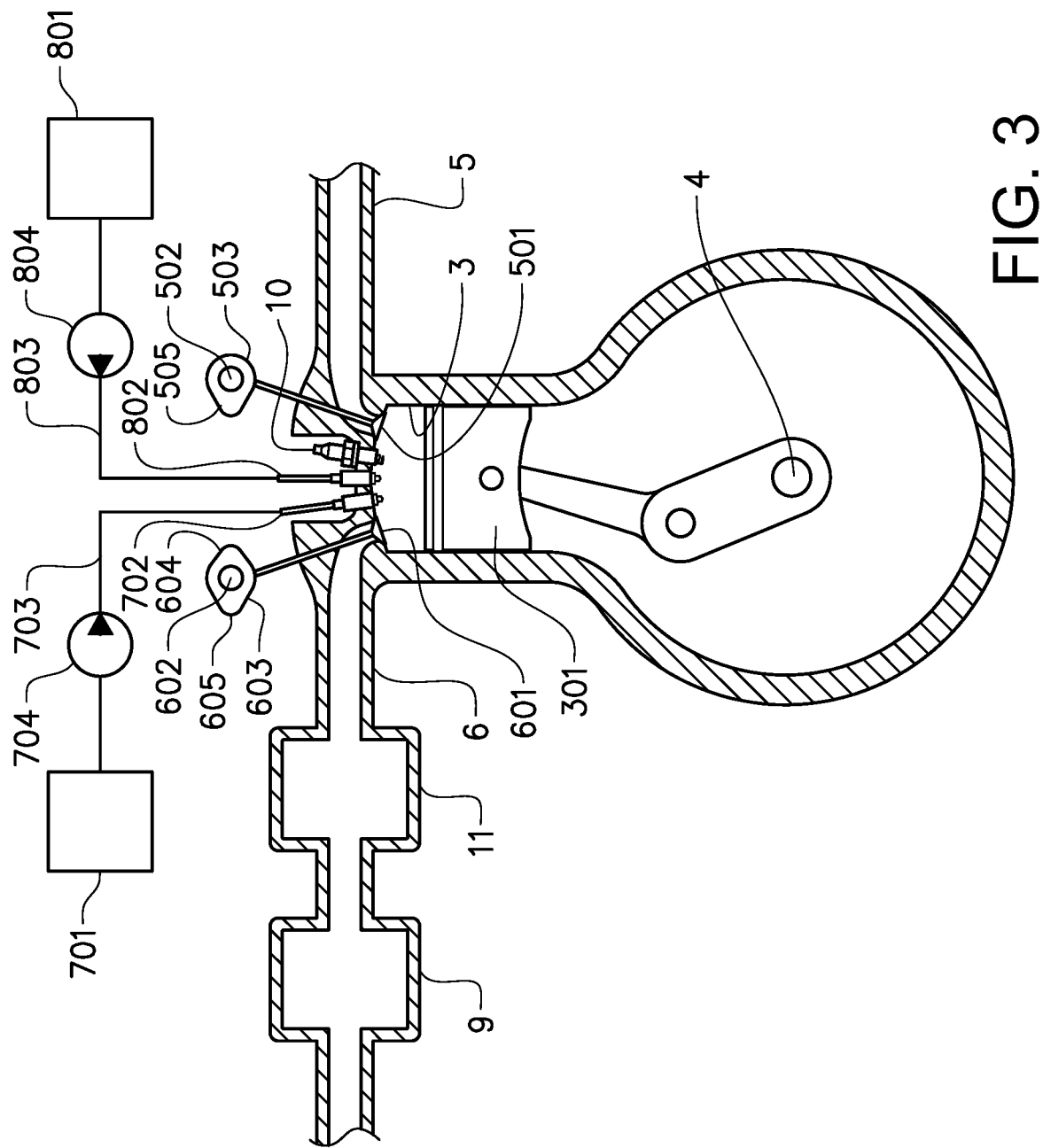
FIG. 3 shows a cross-section of the system in FIG. 2, oriented as indicated by the arrows III-III.

Reference is made also to FIG. 3 in which one of the cylinders 3 is depicted. Each cylinder 3 is provided with a piston 301 connected to a crankshaft 4 of the engine. The system further comprises an intake manifold 5 forming intake guides arranged to guide air to the cylinders 3, and an exhaust guide 6 arranged to guide gases from the cylinders 3.

As can be seen in FIG. 3, the system further comprises a first container 701 for a first fuel, which in this example is a diesel fuel. At each cylinder a first injector 702 is provided to inject the first fuel into the respective cylinder 3. The first injector 702 is arranged to be supplied with the first fuel from the first container 701. For this a first conduit 703 is arranged to provide a communication between the first container 701 and the first injector 702, via a first fuel pump 704 and a common rail (not shown) arranged to distribute the first fuel to all first injectors 702. The first fuel pump may be e.g. of a conventional high pressure common rail system type for heavy vehicle diesel engines, and is suitably adapted to deliver an injection pressure of up to 2500 bar or more. The first fuel pump 704 could comprise e.g. one or more piston rotary pumps or a single piston cam actuated pump-element.

The system further comprises a second container 801 for a second fuel, which in this example is gasoline. Alternatively, the second fuel may be some other high octane fuel, e.g. methanol or methane. The second fuel has a Research Octane Number (RON) of at least 80, preferably at least 92, and more preferably at least 95.

At each cylinder a second injector 802 is provided to inject the second fuel into the respective cylinder 3. The second injector 802 is arranged to be supplied with the second fuel from the second container 801. For this a second conduit 803 is arranged to provide a communication between the second container 801 and the second injector 802, via a second fuel pump 804. The second fuel pump 804 and the second injector 802 may be of types which typically are provided for relatively simple and low cost gasoline direct injection systems, e.g. for private cars.

In each cylinder 3 a spark plug 10 is arranged to ignite a mix of fuel and oxygen in the cylinder as described below.

The system further comprises a three-way catalyst 9, the exhaust guide 6 being arranged to guide gases from the cylinders 3 to the three-way catalyst 9. Upstream of the three-way catalyst 9 a diesel particulate filter 11 is provided. The system may also comprise a turbo charging or turbo compound system (not shown) with a turbine in the exhaust guide 6, upstream of the three-way catalyst 9 and the diesel particulate filter 11, to extract energy e.g. for charging of the air in the intake manifold 5 as is known per se.

Figure 4:
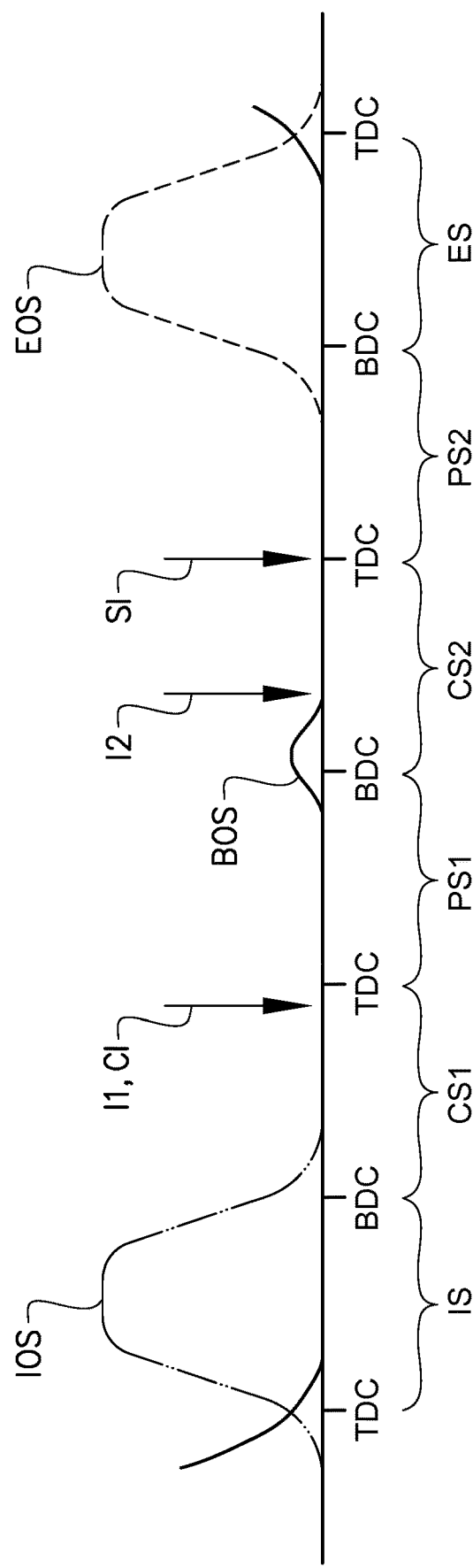
FIG. 4 is a diagram depicting events in a cylinder of the engine system in FIG. 2 and FIG. 3 as a function of piston movements in the cylinder.

Reference is made also to FIG. 4. The system is arranged so as to provide in each cylinder 3 a six-stroke cycle with a sequence of an intake stroke IS, a first compression stroke CS1, a first power stroke PS1, a second compression stroke CS2, a second power stroke PS2 and an exhaust stroke ES.

Referring again to FIG. 3, the system comprises in each cylinder 3 an intake valve 501 arranged to control a communication between the respective cylinder 3 and the intake manifold 5. The system further comprises in each cylinder 3 an exhaust valve 601 arranged to control a communication between the respective cylinder 3 and the exhaust guide 6. The system further comprises a valve actuation assembly, in turn comprising an intake camshaft 502 with intake cam lobes 503 for actuating the intake valves 501, and an exhaust camshaft 602 with exhaust cam lobes 603 for actuating the exhaust valves 601. In other embodiments the intake and exhaust cam lobes 503, 603 may be provided on a common cam shaft. Since the engine is adapted for six-stroke cycle, the camshafts 502, 602 are arranged to rotate at a speed being a third of the rotational speed of the crankshaft 4.

For the actuation of the intake valves 501 the intake cam lobes 503 are each provided with a respective intake nose 505 arranged to provide an intake opening sequence IOS of the respective intake valve 501, described below. For the actuation of the exhaust valves 601 the exhaust cam lobes 603 are each provided with a respective exhaust nose 605 arranged to provide an exhaust opening sequence FOS of the respective exhaust valve 601, described below. The exhaust cam lobe 603 is further provided with a bleed nose 604 for providing a bleed opening sequence BOS of the exhaust valve 601, as described below. The bleed nose 604 is smaller than the exhaust nose 605.

The valve actuation assembly further comprises an intake cam phasing assembly 506 is arranged to provide cam phasing of the intake camshaft 502, i.e. to change the phase of the intake camshaft rotation in relation to the rotation of the crankshaft 4. The valve actuation assembly also comprises an exhaust cam phasing assembly 606 is arranged to provide cam phasing of the exhaust camshaft 602, i.e. to change the phase of the exhaust camshaft rotation in relation to the rotation of the crankshaft 4.

A control unit 21 is arranged to control the intake and exhaust cam phasing assemblies 506, 606. The control unit 21 is further arranged to receive signals from a lambda sensor 211 in the form of an oxygen sensor located in the exhaust guide 6 and adapted to measure the proportion of oxygen in the exhaust gases in the exhaust guide 6. The control unit 21 is also arranged to receive signals from a temperature sensor 213 located in the exhaust guide 6. The control unit 21 is in addition arranged to receive signals from a temperature sensor 214 located in the three-way catalyst 9.

The control unit 21 is also arranged to receive signals from an air mass flow sensor 212 in the intake manifold 5. The control unit 21 is adapted to determine a load of the engine based on the engine speed and the air-fuel ratio, as is known per se. As understood from examples herein, the control unit may be arrange to control the two consecutive combustions, described below, in all aspects of torque output, efficiency optimization and emission control.

As can be seen in FIG. 2, the system further comprises an exhaust gas recirculation conduit 12, arranged to guide gases from the exhaust guide 6 to the intake manifold 5. An exhaust recirculation valve 121 is arranged to control the communication through the exhaust gas recirculation conduit 12. The exhaust recirculation valve 121 is controllable by the control unit 21.

Figure 5:
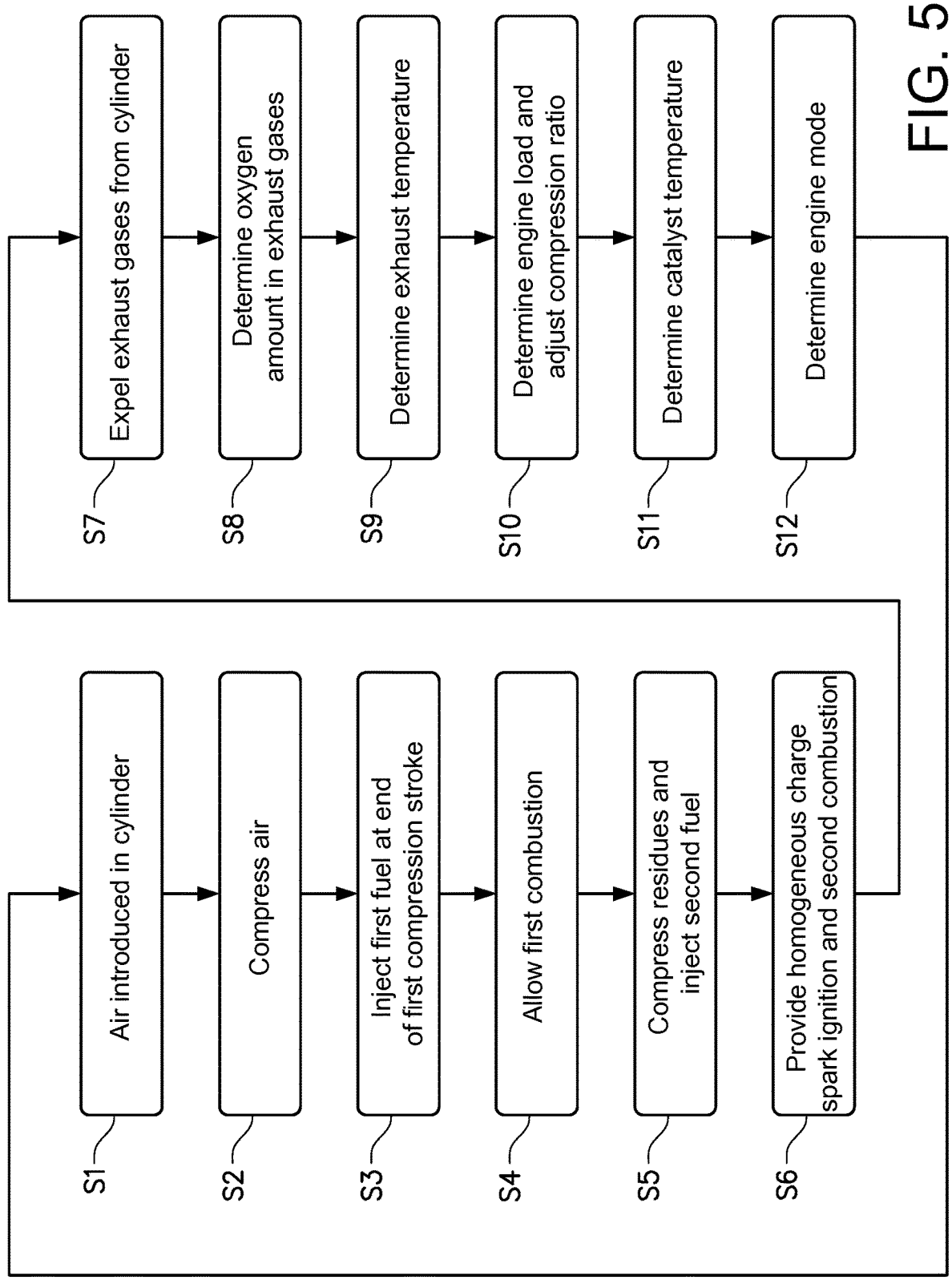
FIG. 5 is a block diagram depicting steps in a method for operating an engine in the system in FIG. 2 and FIG. 3.

Reference is also made to FIG. 5 depicting steps in a method for operating the engine in the system described with reference to FIG. 2 and FIG. 3. The method is described with reference to one of the cylinders 3, but it is understood that the steps therein are performed in all cylinders with phase shifting according to the cylinder firing order.

With actuation by the intake cam lobe 503 of the intake valve 501, air is introduced S1 into the cylinder 3 in the intake opening sequence IOS. As can be seen in FIG. 4, a major portion of the intake opening sequence IOS coincides with the intake stroke IS. The intake valve 501 is moved to a closed position and the air is compressed S2 in a first compression stroke CS1 of the cylinder 3.

As can be seen in FIG. 4, at the end of the first compression stroke CS1 first fuel is injected I1, S3 into the cylinder 3 by means of the first injector 702. Alternatively, said injection I1, S3 may be done at the beginning of the first power stroke PS1. Thereupon a first combustion is allowed S4 in the form of a diffusion combustion of the injected first fuel with a portion of the oxygen in the compressed air as oxidant. The first combustion will produce power to the crankshaft 4 in the first power stroke PS1. The first combustion will produce residues including carbon dioxide ($CO_2$), dioxygen ($O_2$), soot, and nitrogen oxides ($NO_x$). The oxygen available e.g. in the dioxygen and the nitrogen oxides, is combusted in a second combustion as described below.

Subsequently the residues are compressed S5 in the second compression stroke CS2. Also, during the second compression stroke CS2 second fuel is injected I2, S5 into the cylinder 3 by means of the second fuel injector 802. Said injection I2 of the second fuel is provided close shortly before the middle of the second compression stroke. In other embodiments, said injection I2 of the second fuel is provided at the beginning of the second compression stroke CS2, or at the end, of the first power stroke PS1. The injected second fuel is mixed with the residues from the first combustion.

Thereupon, at the end of the second compression stroke CS2 or at the beginning of the second power stroke PS2, the spark plug 10 is controlled to provide a spark so as to provide S6 a Homogenous Charge Ignition in the form of a Homogenous Charge Spark Ignition SI and a second combustion of the mix of second fuel and oxygen in the residues from the first combustion.

The second combustion will produce power to the crankshaft 4 in the second power stroke PS2. In addition, the first combustion provides an effective lean diesel operation, while the second combustion may use the remaining oxygen to provide a lambda value of 1 for the total cycle. Thus, the second combustion is a substantially stoichiometric combustion. In addition, the second combustion will consume the soot as well as the nitrogen oxides in the residues from the first combustion. This makes it possible to use the relatively simple and small three-way catalyst 9, as opposed to a complex, costly and large exhaust treatment unit, such as a selective catalytic reduction (SCR) unit, normally used for diesel engines. In many embodiments, the second fuel used in a cycle may amount to e.g. 15-20% of the total fuel amount in the cycle.

Subsequently the exhaust gases produced by the second combustion are expelled S7 from the cylinder 3 during the exhaust stroke ES by means of the exhaust opening sequence EOS, whereby the exhaust gases are allowed to be guided to the three-way catalyst 9.

Figure 6:
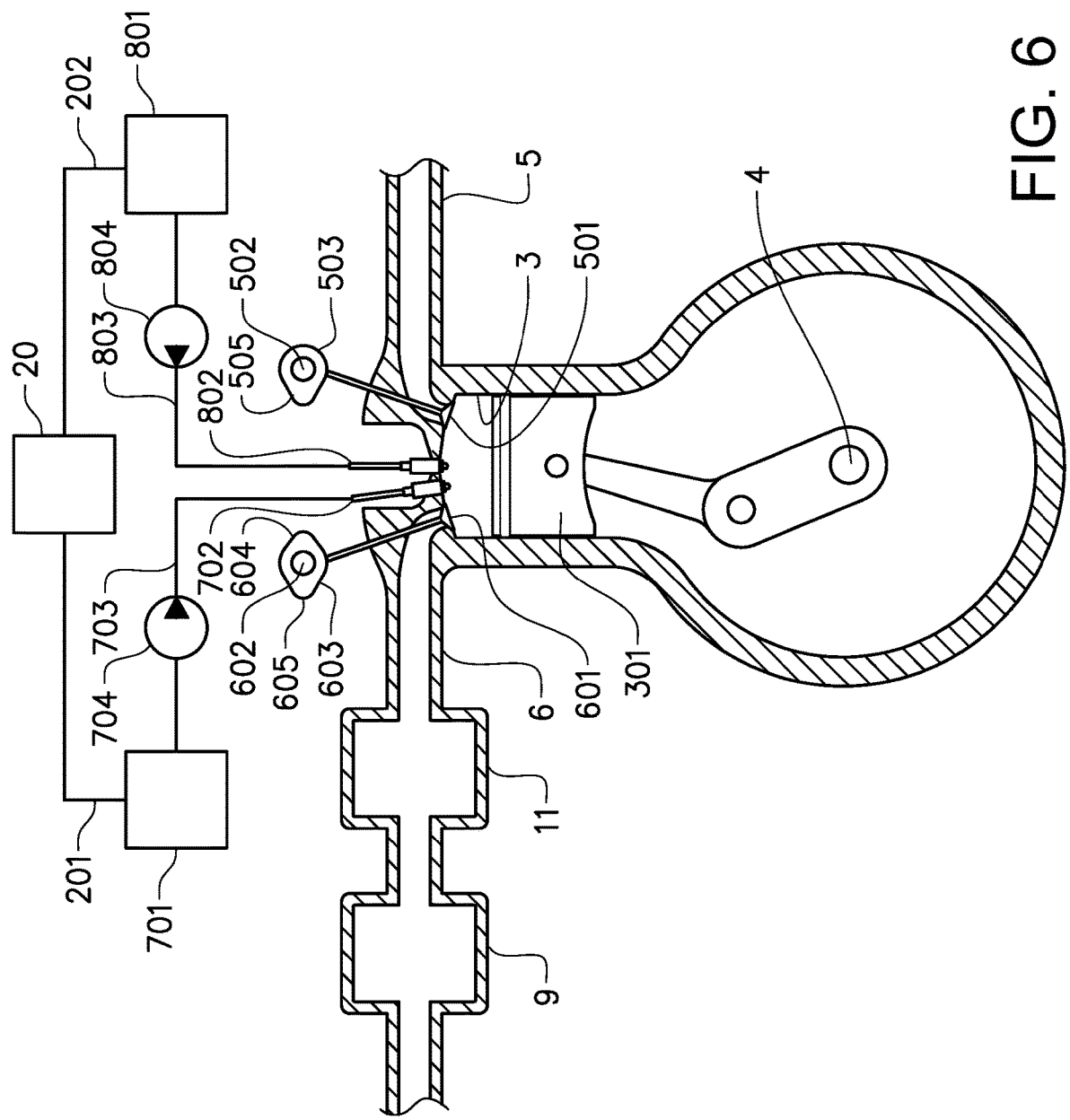
FIG. 6 shows a cross-section corresponding to the cross-section in FIG. 3, of an engine system according to an alternative embodiment of the invention.

It should be noted that the second combustion may be in alternative embodiments, such as the one presented below with reference to FIG. 6, provided as a Homogenous Charge Compression Ignition (HCCI) or a partially homogeneous charge compression ignition (pHCCI). Thereby, no sparkplugs 10 need to be provided in the cylinders 3.

By means of the lambda sensor 211 the control unit 21 determines S8 an amount of oxygen in the exhaust gases produced by the second combustion. Based on the determined amount of oxygen the control unit 21 determines or adjusts the amount of second fuel to be injected S5, I2 in the following cycle. The amount of second fuel injected can thereby be continuously adjusted for the second combustions to remain stoichiometric combustions throughout different operational conditions of the engine system.

By means of the temperature sensor 213 the control unit 21 determines S9 the temperature of the exhaust gases in the exhaust guide 6. Based the determined temperature, the control unit 21 controls or adjusts the timing of the injection I1 of the first fuel and the amount of the first fuel injected at the injection I1 of the first fuel. Thereby, the temperature of the residues from the first combustion can be controlled, e.g. to avoid pre-ignition of the mix of the residues and the second fuel in the second combustion stroke CS2, i.e. to avoid an ignition of said mix before a desired and efficient timing or crankshaft angle for the Homogenous Charge Ignition.

As can be seen in FIG. 4, a bleed opening sequence BOS of the exhaust valve 601 is provided so as to bridge the end of the first power stroke PS1 and the beginning of the second compression stroke CS2. The control unit 21 is arranged to control the exhaust cam phasing assembly 606 to adjust an overlap of the opening sequence BOS and the second compression stroke CS2. This is done to adjust the compression ratio of the second compression stroke CS2. Increasing said overlap will decrease the compression ratio of the second compression stroke CS2, and vice versa.

In embodiments where the ignition of the second fuel is provided by HCCI or pHCCI, as the one presented below with reference to FIG. 6, the adjustment of the bleed function, in turn adjusting the compression ratio of the second compression stroke CS2, can be made to provide an optimal timing of the HCCI or pHCCI event. Also, in embodiments with any suitable type of ignition of the second fuel, the adjustment of the compression ratio of the second compression stroke CS2 may be used for engine load and speed control. Thus, the control unit 21 may further be arranged to determine S10 the current requested load of the engine, and adjust the compression ratio of the second compression stroke CS2 at least partly based on the requested engine load. Preferably, at relatively high engine loads, the compression ratio of the second compression stroke CS2 is controlled to be relatively low, and at relatively low engine loads, the compression ratio of the second compression stroke CS2 is controlled to be relatively high, or even maintained at the geometrical diesel compression ratio.

The control unit is further arranged to match the timing of the bleed opening sequence BOS with a control signal so as to temporarily open the exhaust recirculation valve 121 to guide residues released by the bleed opening sequence BOS via the exhaust gas recirculation conduit 12 to the intake manifold 5.

In alternative embodiments, the bleed nose 604 may be provided on the intake cam lobe 503. Thereby, the compression ratio of the second compression stroke CS2 may be adjusted by controlling the intake cam phasing assembly 506. In further alternative embodiments the bleed function may be provided by a separate additional valve arranged to control the communication between the cylinder and the exhaust guide 6 or the intake manifold 5. Such an additional valve may be controlled by a bleed nose 604 on the exhaust or intake camshaft 502, 602 as described above, or it could be controlled hydraulic or electrically.

The method also includes steps for choosing between two operational engine modes depending on whether or not a cold start process for the three-way catalyst is required. More specifically, the method in this embodiment includes the control unit 21 determining S11 by means of the temperature sensor 214 in the three-way catalyst, the temperature of the catalyst 9. Based on the catalyst temperature and the requested engine load the control unit 21 determines S12 whether the engine should be operated at the requested load in a first mode or a second mode. If the catalyst temperature is above a threshold value for the requested load, the engine is operated in the first mode. However, if the catalyst temperature is below a threshold value for the requested load, the engine is operated in the second mode for the cold start process of the catalyst 9.

The amount of first fuel injected I1, S3 for the first combustion is smaller in the second mode than in the first mode, and the amount of second fuel injected I2, S5 for the second combustion is larger in the second mode than in the first mode. Also, in the second mode for the catalyst cold start, the exhaust cam phasing assembly 606 is controlled so as to increase, compared to the first mode, an overlap of the exhaust opening sequence EOS (FIG. 4) of the exhaust valve 601 and the second power stroke PS2.

By the decreased amount of first fuel in the first combustion, the oxygen in the residues from the first combustion in the form of the diffusion combustion will increase. The increased amount of fuel in the second combustion mixed with said increased amount of oxygen will provide for more energy being released by the second combustion in the second mode compared to the first mode. In addition, the increased overlap of the exhaust opening sequence EOS and the second power stroke PS2 will allow the combustion process to continue in the exhaust guide 6 and thereby increase the temperature in the three-way catalyst 9. This provides an extremely rapid cold start process of the three-way catalyst 9.

Reference is made to FIG. 6 depicting an alternative embodiment of the invention. This embodiment shares features with the embodiment presented with reference to FIG. 2-FIG. 5, with the following exceptions:

The system farther comprises a fuel reforming assembly 20, herein also referred as a fuel cracking and reforming assembly, arranged to reform the diesel fuel from the first container 701 to produce the second fuel which has a high octane number, in the form of a gas. Thereby the diesel may be reformed to a mix of carbon monoxide and hydrogen. The fuel reforming assembly 20 is adapted to provide a catalytic decomposition process converting the diesel fuel to the high octane gaseous fuel. The fuel reforming assembly 20 may be driven by exhaust heat from the engine system. A reformer supply conduit 201 is arranged to guide the first fuel from the first container 701 to the fuel reforming assembly 20. A reformed fuel conduit 202 is arranged to guide the second fuel from the fuel reforming assembly 20 to the second container 801. The fuel reforming assembly 20 provides an onboard fuel conversion function whereby the vehicle may be refueled with a single fuel type during operations.

Also the engine system in FIG. 6 is adapted to provide the Homogenous Charge Ignition as a Homogenous Charge Compression Ignition (HCCI) or a partially homogeneous charge compression ignition (pHCCI). Therefore, no sparkplugs are provided in the cylinders 3.

Reference is made to FIG. 7a-7d in which one of the cylinders 3 in a multi-cylinder engine according to an alternative embodiment of the invention is depicted. Each of FIG. 7a-7d shows the cylinder in a respective stroke of a repeated cycle of the cylinder, described further below. Each cylinder 3 is provided with a piston 301 connected to a crankshaft 4 housed in a crankcase 401. The engine shares features with known crankcase-scavenged two-stroke engines. The crankcase 401 is divided transversally between adjacent cylinders to provide a separate crankcase chamber for each cylinder. The engine comprises for each cylinder an air conduit 511 arranged to guide air from the atmosphere to the crankcase 401, more specifically to the crankcase chamber for the respective cylinder. It is understood that portions of the air conduits 511 for separate cylinders may be partly joined in a joint conduit, and partly provided as branches from the joint conduit, each branch extending from the joint conduit up to the crankcase chamber for the respective cylinder. The engine further comprises for each cylinder an intake guide 5 arranged to guide air to the cylinder 3 from the crankcase 401, more specifically to the crankcase chamber for the respective cylinder.

In the air conduit 511, flow control means in the form of a control valve 512 is arranged to selectively allow or block the flow through the air conduit 511. The control valve 512 is arranged to be controlled by a control unit 21 (FIG. 7a). Such a control valve 512 is provided in each of the air conduit parts branching off from the joint conduit.

The engine also comprises an exhaust guide 6 arranged to guide gases from the cylinder 3 to the atmosphere via an exhaust after treatment system (not shown). The engine further comprises in each cylinder 3 an exhaust valve 601 arranged to control a communication between the respective cylinder 3 and the exhaust guide 6. The engine further comprises an exhaust valve actuation assembly (not shown), e.g. with an exhaust camshaft arranged to rotate at a speed being half of the rotational speed of the crankshaft 4.

At the cylinder a first injector 702 is provided to inject the first fuel into the cylinder 3. The first injector 702 is arranged to be supplied with the first fuel from a first container (not shown) via a first fuel pump (not shown) and a common rail (not shown) arranged to distribute the first fuel to first injectors in all cylinders. The first fuel pump may be e.g. of a high pressure common rail system type for heavy vehicle diesel engines. The first fuel pump is suitably adapted to deliver an injection pressure of up to 2500 bar or more. The first fuel injector 702 may be of a suitable type for diesel engines.

A second container (not shown) is provided for a second fuel, e.g. gasoline, or some other high octane fuel, e.g.

methanol or methane. At each cylinder a second injector 802 is provided to inject the second fuel into the cylinder 3. The second injector 802 is arranged to be supplied with the second fuel from the second container via a second fuel pump (not shown). The second fuel pump and the second injector 802 may be of types which typically are provided for relatively simple and low cost gasoline direct injection systems, e.g. for private cars.

Figure 8:
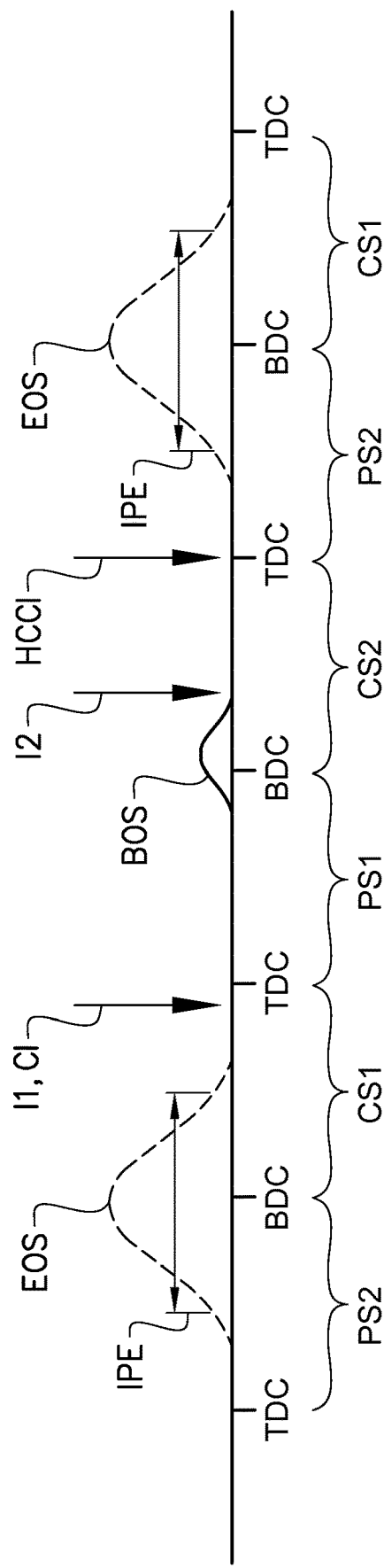
FIG. 8 is a diagram depicting events in the cylinder in FIG. 7a-7d as a function of piston movements in the cylinder.

Reference is made also to FIG. 8. The engine is arranged so as to provide in each cylinder 3 a repeated four-stroke cycle with a sequence of a first compression stroke CS1, a first power stroke PS1, a second compression stroke CS2 and a second power stroke PS2. The engine is arranged for the first compression stroke CS1 to be repeated immediately after the second power stroke PS2.

Figure 7B:
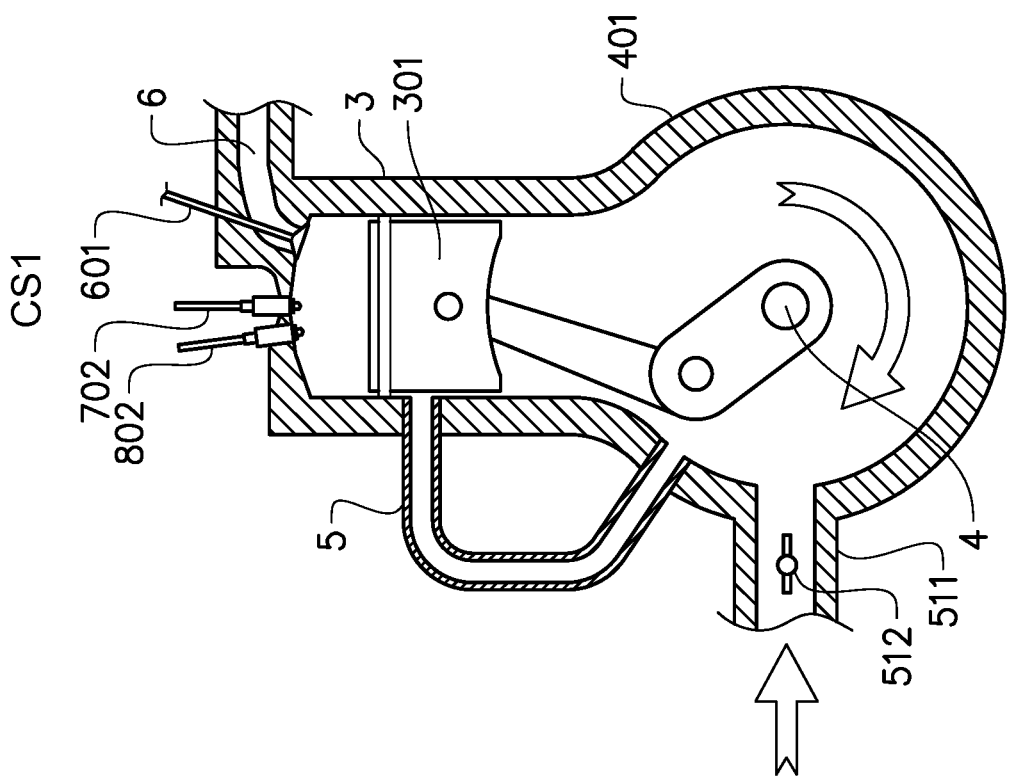
FIG. 7a-7d depict a cross-section of a cylinder in an engine according to another embodiment of the invention, where each of FIG. 7a-7d shows the cylinder in a respective stroke of a repeated cycle of the cylinder.
Figure 7A:
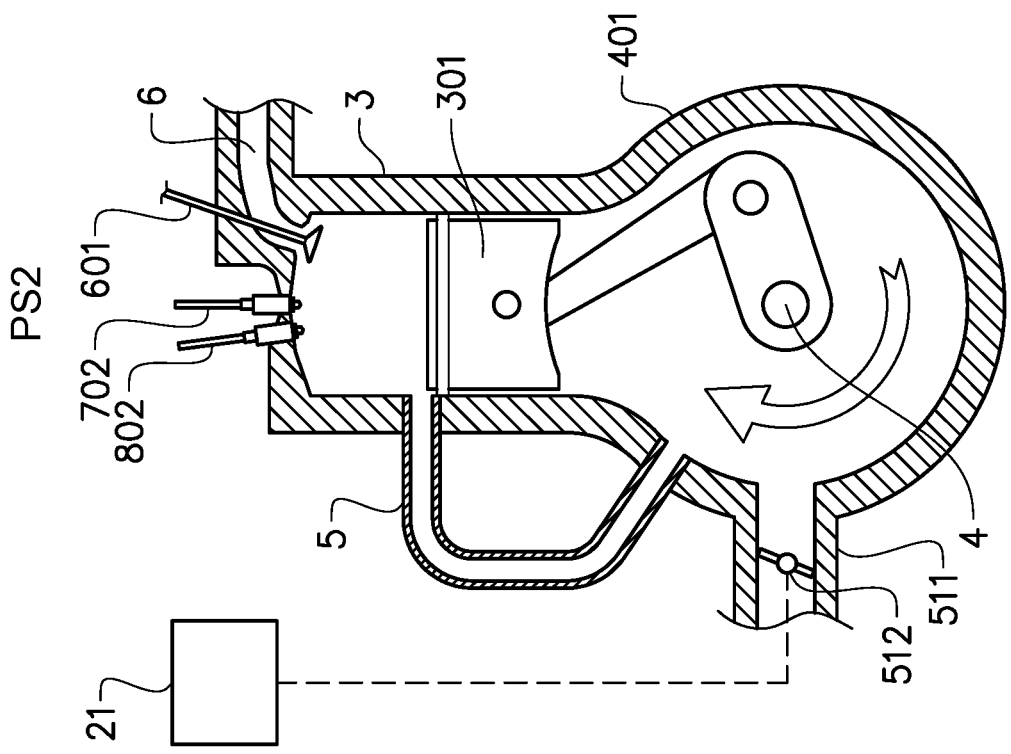
Figure 7C:
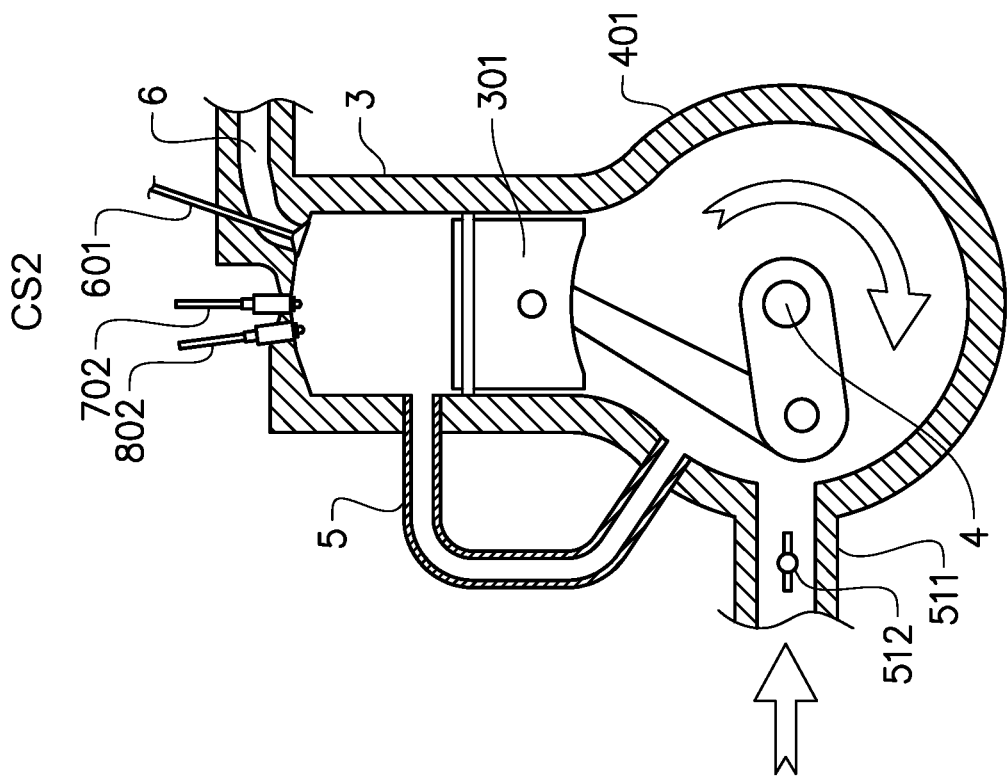
Figure 7D:
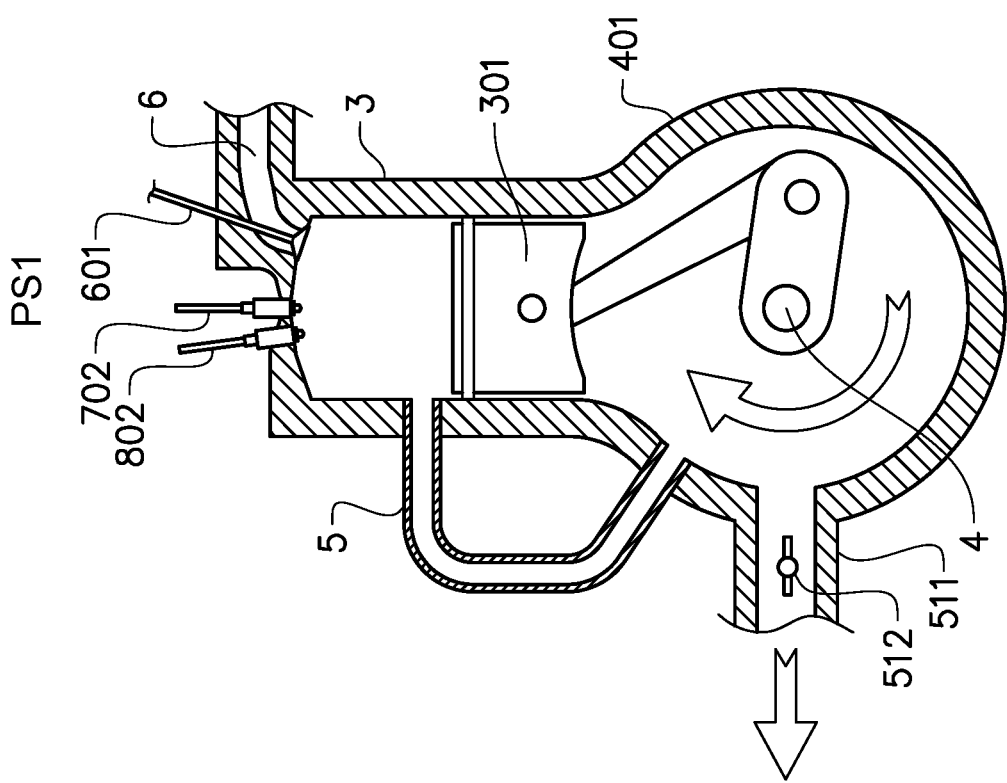

When the piston 301 moves, as depicted in FIG. 7d, towards its top dead center (TDC) position in the second compression stroke CS2, the control valve 512 is kept open and air is introduced to the crankcase 401 via the air conduit 511. When the piston reaches the TDC position at the end of the second compression stroke CS2, the control valve 512 is closed, and the control valve is kept closed during the second power stroke PS2, depicted in FIG. 7a. Thereby, the pressure in the crankcase 401 is increased.

The intake guide 5 is arranged to communicate with the cylinder 3 at an intake port provided in the cylinder wall. It is understood that more than one intake port may be provided in each cylinder. The intake port is blocked by the piston 301 when the latter is at a distance from its bottom dead center (BDC) position. Close to the BDC position of the piston 301 the intake port is exposed during a crankshaft made interval IPE indicated in FIG. 8.

The exhaust valve actuation assembly is arranged to provide an exhaust opening sequence EOS (FIG. 8) of the exhaust valve 601, at the end of the second power stroke PS2 and at the beginning of the first compression stroke CS1.

By the pressure buildup in the crankcase 401 during the second power stroke PS2, air is introduced to the cylinder via the intake guide 5 at the end of the second power stroke PS2 and at the beginning of the first compression stroke CS1. FIG. 7a shows the cylinder at the end of the second power stroke PS2, when communication is allowed between the intake guide 5 and the cylinder. Simultaneously, exhaust gases produced by a second combustion, described below, are expelled from the cylinder 3 by means of the exhaust opening sequence EOS. Thereby, by means of the piston 301 and intake guide 5 interaction, and the exhaust valve 601 actuation, a scavenging process is provided at the end of the second power stroke PS2 and at the beginning the first compression stroke CS1.

Reference is made to FIG. 7b. As the piston moves towards the IDC position during the first compression stroke CS1, the piston 301 blocks the intake guide 5, the exhaust valve 601 is closed, and the introduced air is compressed. Also as the piston moves towards the TDC position during the first compression stroke CS1, the control valve 512 in the air conduit 511 is opened.

As can be seen in FIG. 8, at the end of the first compression stroke CS1 first fuel is injected I1 into the cylinder 3 by means of the first injector 702. Alternatively, said injection I1 may be done at the beginning of the first power stroke PS1. Thereupon a first combustion is allowed in the form of a diffusion combustion of the injected first fuel with a portion of the oxygen in the compressed air as oxidant. The first combustion will produce power to the crankshaft 4 in the first power stroke PS1, depicted in FIG. 7c. The first combustion will produce residues including carbon dioxide ($CO_2$), (dioxygen ($O_2$), soot, and nitrogen oxides ($NO_x$).

The control valve 512 in the air conduit 511 is kept open during the first power stroke PS1. Thereby, air will be allowed to escape or flow out of the crankcase 401 through the air conduit 511. This will prevent the build-up of pressure in the crankcase 401. This means that at the end of the first power stroke, when the intake guide 5 is exposed to the cylinder 3, there will not be any pressure to force air into the cylinder. Thereby, the introduction of air into the cylinder is prevented by the control valve 512 being kept open during the first power stroke PS1.

The residues from the first combustion are compressed in the second compression stroke CS2. Also, during the second compression stroke CS2 second fuel is injected I2 into the cylinder 3 by means of the second fuel injector 802. Said injection I2 of the second fuel is provided close shortly before the middle of the second compression stroke. The injected second fuel is mixed with the residues from the first combustion. Thereupon a Homogenous Charge Compression Ignition (HCCI), or a partially homogeneous charge compression ignition (pHCCI), is provided with the second fuel and oxygen in the residues from the first combustion, to produce a second combustion. The second combustion will produce power to the crankshaft 4 in the second power stroke PS2. It is in that for the HCCI or pHCCI, no sparkplugs are provided in the cylinders 3. However, in alternative embodiments, a spark plug 10 may be arranged in each cylinder 3 to ignite the mix of fuel and oxygen in the residues.

Similarly to the embodiments described above with reference to FIG. 2-FIG. 6, the exhaust valve actuation assembly is arranged to provide a bleed opening sequence BOS of the exhaust valve 601. As can be seen in FIG. 8, the bleed opening sequence BOS of the exhaust valve 601 is provided so as to bridge the end of the first power stroke PS1 and the beginning of the second compression stroke CS2. Thereby, a lower compression ratio may be provided at the second compression stroke CS2, compared to the compression ratio at the first compression stroke CS1, so that the compression ratio at the second compression stroke CS2 is more suited to the Homogenous Charge Ignition for the second combustion.

Similarly to the embodiments described above with reference to FIG. 2-FIG. 6, the first combustion, e.g. with a lambda value within 1.15 and 3.0, provides an effective lean diesel operation, while the second combustion may use the remaining oxygen to provide a lambda value of 1 for the total cycle. Thus, the second combustion is a substantially stoichiometric combustion. In addition, the second combustion will consume the soot as well as the nitrogen oxides in the residues from the first combustion. This makes it possible to use in the exhaust guide 6 a relatively simple and small three-way catalyst.

Similarly to the embodiments described above with reference to FIG. 2-FIG. 6, a lambda sensor may be provided in the exhaust guide 6, and the lambda sensor may be used to determine an amount of oxygen in the exhaust gases produced by the second combustion. Based on the determined amount of oxygen the amount of second fuel to be injected I2 in the following cycle may be determined or adjusted. The amount of second fuel injected can thereby be continuously adjusted for the second combustions to remain stoichiometric combustions throughout different operational conditions of the engine system.

Also, similarly to the embodiments described above with reference to FIG. 2-FIG. 6, the temperature of the exhaust gases in the exhaust guide 6 may be determined. Based the determined temperature, the timing of the injection I1 of the first fuel and the amount of the first fuel injected at the injection I1 of the first fuel may be controlled or adjusted. Thereby, the temperature of the residues from the first combustion can be controlled, e.g. to avoid pre-ignition of the mix of the residues and the second fuel in the second combustion stroke CS2.

Further, similarly to the embodiments described above with reference to FIG. 2-FIG. 6, an overlap of the opening sequence BOS and the second compression stroke CS2 may be adjusted to adjust the compression ratio of the second compression stroke CS2, to provide an optimal timing of the HCCI or pHCCI event, and/or for engine load and speed control.

In addition, similarly to the embodiments described above with reference to FIG. 2-FIG. 6, the temperature of a catalyst in the exhaust guide 6, indicative of whether or not a cold start process for the catalyst is required may be determined, and based on the catalyst temperature and the requested engine load it could be determined whether the engine should be operated at the requested load in a first mode or a second mode.

Reference is made to FIG. 9a-9d depicting a cylinder in an engine according to a further embodiment of the invention. The engine is similar to the engine described with reference to FIG. 7a-7d, except for the following features:

An air conduit 511 is arranged to guide air from the atmosphere via a compressor 513 to the crankcase 401, more specifically to the crankcase chamber for the respective cylinder. The air conduits 511 for separate cylinders are partly joined in a joint conduit, in which the compressor 513 is provided. At a branching point 515 downstream of the compressor 513, parts of the air conduits 511 branch off from the joint conduit, each branch extending from the branching point 515 up to the crankcase chamber for the respective cylinder.

The compressor may be driven in any suitable manner: For example the compressor may be a part of a turbocharger and arranged to be driven by a turbine in the exhaust guide 6. In some embodiments, instead of a compressor, a blower may be provided in the air conduit 511.

Further a discharge guide 514 is arranged to provide a communication between the respective air conduit 511 and the atmosphere. A junction between the air conduit 511 and the discharge guide 514 is located between the compressor 513 and the crankcase 401. Further, the junction between the air conduit 511 and the discharge guide 514 is located between the branching point 515 and the crankcase 401. Flow control means comprises a flow control valve 512 in the air conduit, between the compressor and said junction, and a control valve 512 in the discharge guide 514, both control valves being arranged to be controlled by a control unit (not shown). In alternative embodiments, the flow control means may be provided as a control valve in the form of a three-way valve at said junction the control valve 512.

When the piston 301 moves, as depicted in FIG. 9d, towards its TDC position in the second compression stroke CS2, the flow control means 512 is controlled so as to provide a comma communication between the compressor 513 and the crankcase 401, and to block the communication between the air conduit 511 and the discharge guide 514. Thereby air from the compressor 513 is allowed into the crankcase 401.

When the piston reaches the TDC position at the end of the second compression stroke CS2, the flow control means 512 is controlled so as to block the communication between the compressor 513 and the crankcase 401, and to block the communication between the air conduit 511 and the discharge guide 514. The flow control means 512 is kept in this position during the second power stroke PS2, depicted in FIG. 9a. Thereby, the pressure in the crankcase 401 is increased.

By the pressure buildup in the crankcase 401 during the second power stroke PS2, air is introduced to the cylinder via the intake guide 5 at the end of the second power stroke PS2 and at the beginning of the first compression stroke CS1.

Figure 9A:
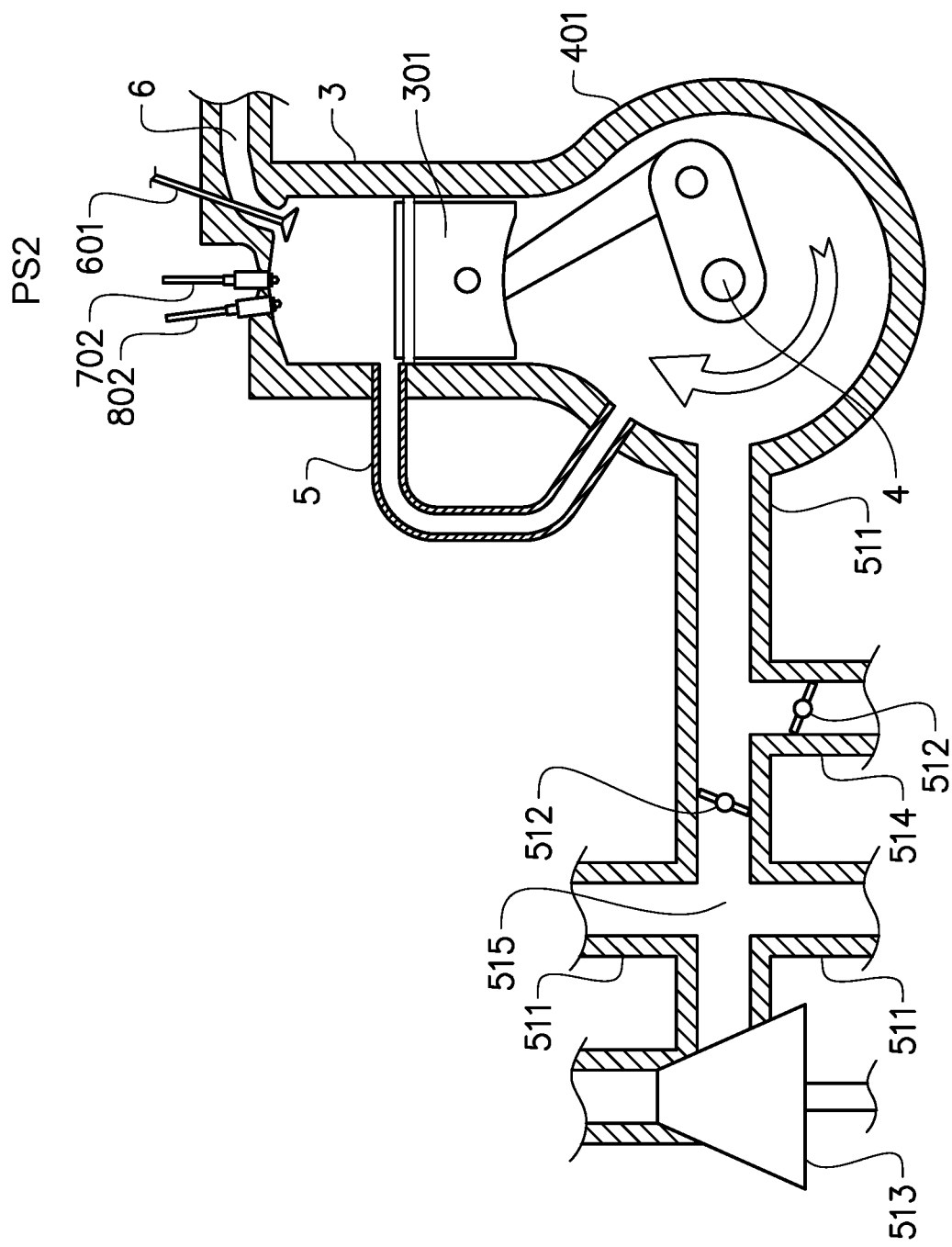
Figure 9B:
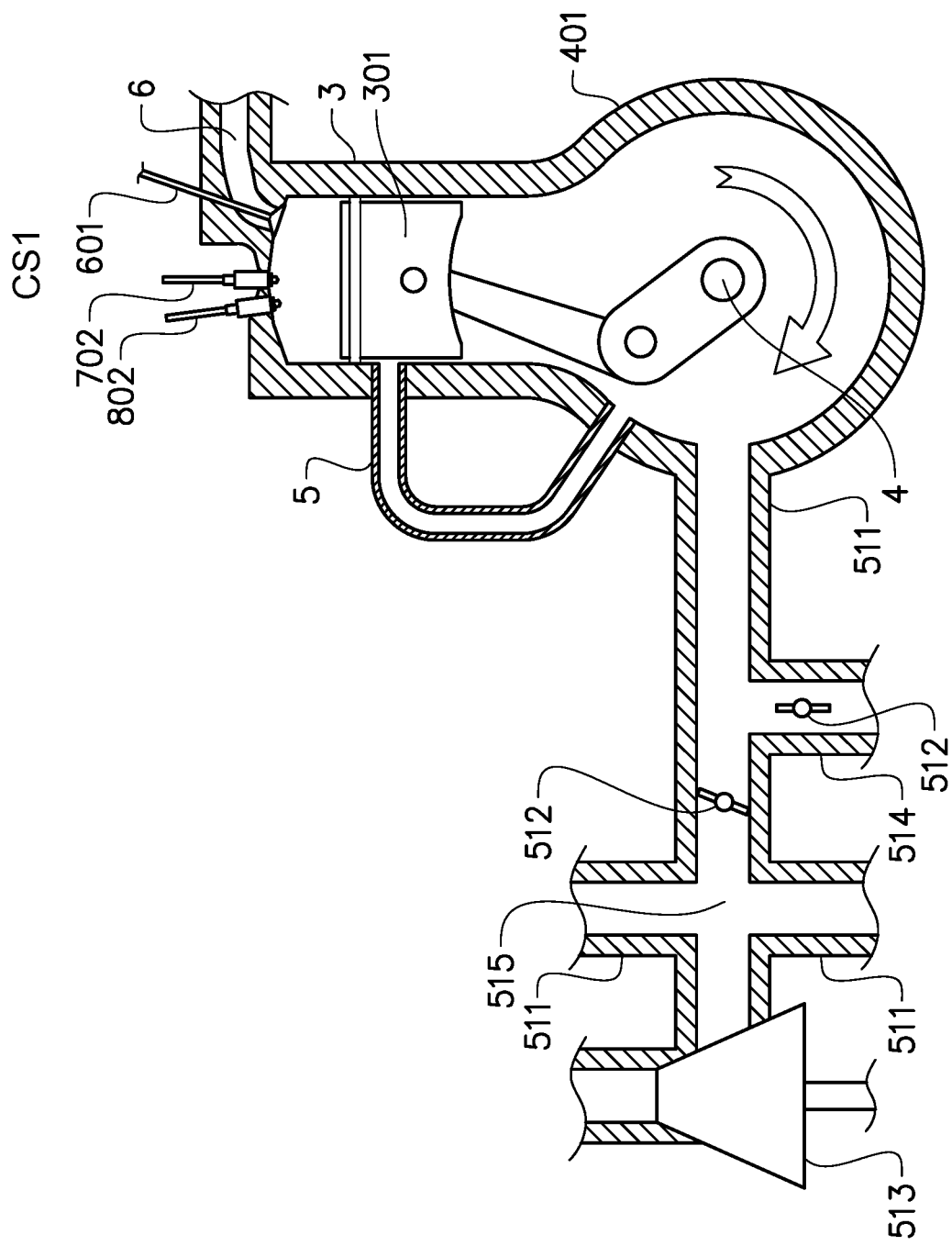

As the piston moves towards the TDC position during the first compression stroke CS1, depicted in FIG. 9b, the flow control means 512 is controlled so as to block the communication between the compressor 513 and the crankcase 401, and to allow a communication between the air conduit 511 and the discharge guide 514. Thereby, the air from the atmosphere is drawn into the crankcase 401 via the discharge guide 514 and a portion of the air conduit 511.

Figure 9C:
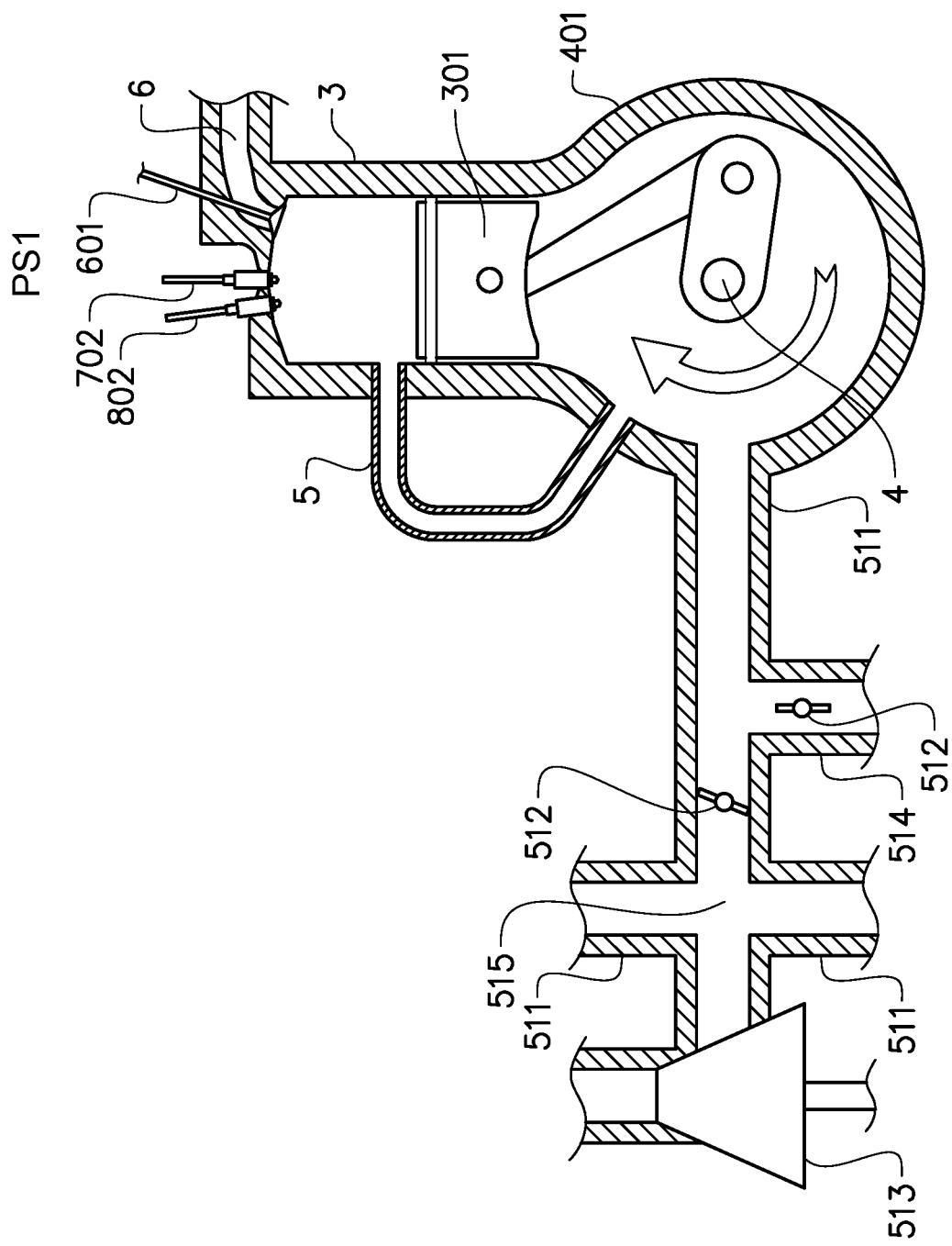

During the first power stroke PS1, depicted in FIG. 9c, the flow control means 512 is kept in the position so as to block the communication between the compressor 513 and the crankcase 401, and to allow the communication between the air conduit 511 and the discharge guide 514. Thereby, air will be allowed to escape or flow out of the crankcase 401 through the discharge guide 514. This will prevent the build-up of pressure in the crankcase 401, more specifically in the crankcase chamber for the respective cylinder. This means that at the end of the first power stroke, when the intake guide 5 is exposed to the cylinder 3, there will not be any pressure to force air into the cylinder. Thereby, the introduction of air into the cylinder is prevented by the flow control means 512 being controlled so as for air to flow out of the crankcase 401 through the discharge guide 514 during the first power stroke PS1.

As a further modification of the embodiment described with reference to FIG. 7a-7d, instead of crankcase scavenging, the engine could be arranged to introduce air to the cylinders without passing the air via the crankcase. For example, the engine may be provided with an intake guide for each cylinder, arranged to guide air from the atmosphere to the respective cylinder. A compressor or a blower could be arranged in the intake guide to force air to the cylinder. Similarly to the engines described with reference to FIG. 7a-9d, an engine without crankcase scavenging may be arranged to provide a cycle with a first compression stroke, a first power stroke, a second compression stroke, and a second power stroke. Flow control means, comprising a control valve in each intake guide, is preferably arranged to allow air to reach the respective cylinder at the end of the second power stroke and at the beginning of the first compression stroke, but to prevent air to reach the respective cylinder at the end of the first power stroke and at the beginning of the second compression stroke. In multi-cylinder engines, parts of the intake guides may be joined so as to form a joint conduit, in which the compressor of blower is provided. Parts of the intake guides, each presenting a respective of said control valve, could extent from the joint conduit to the respective cylinder.

It is to be understood that the present invention is not limited to the embodiments described above and illustrated in the drawings; rather, the skilled person will recognize that many changes and modifications may be made within the scope of the appended claims.

Embodiments of the invention may be defined with the following clauses:

1. A method for operating an internal combustion piston engine, comprising
introducing (S1, IOS) air into a cylinder (3) of the engine, compressing the air in a first compression stroke (CS1) of the cylinder (3),
injecting (S3, I1) a first fuel into the cylinder (3),
allowing (S4) a first combustion of the injected first fuel with a portion of the oxygen in the compressed air as oxidant, to produce, power to a crankshaft (4) of the engine in a first power stroke (PS1) succeeding the first compression stroke (CS1), and to produce residues including oxygen, and
compressing (S5) the residues in a second compression stroke (CS2) succeeding the first power stroke (PS1),
characterized by injecting (S5, I2) into the cylinder (3) a second fuel of a type which is different from that of the first fuel, and allowing a second combustion of the second fuel with the oxygen of the residues as oxidant to produce power to the crankshaft (4) of the engine in a second power stroke (PS2) succeeding the second compression stroke (CS2), and
by controlling the amount of second fuel injected in the step of injecting the second fuel so as for the second combustion to be a stoichiometric combustion.

2. A method according to clause 1, characterized in that the first combustion is provided by a compression ignition.

3. A method according to any one of the preceding clauses, characterized in that the injection of the first fuel forms the first combustion in the form of a diffusion combustion.

4. A method according to any one of the preceding clauses, characterized in that the first fuel is diesel fuel.

5. A method according to clause 4, characterized by supplying the diesel fuel for the injection (S3, I1) thereof from a container (701), and reforming diesel fuel from the container (701) to produce the second fuel in the form of gasoline.

6. A method according to any one of the preceding clauses, characterized by controlling the temperature of the residues by controlling the timing of the injection (S3, I1) of the first fuel, and/or by controlling the amount of the first fuel injected at the injection (S3, I1) of the first fuel.

7. A method according to any one of the preceding clauses, characterized in that the second combustion is provided on a premix of the second fuel with the oxygen of the residues as oxidant.

8. A method according to any one of the preceding clauses, characterized in that the second combustion is provided by a Homogenous Charge Ignition.

9. A method according to any one of the preceding clauses, characterized in that the second combustion is provided by a Homogenous Charge Compression Ignition, a partially Homogenous Charge Compression Ignition or a Homogenous Charge Spark Ignition.

10. A method according to any one of the preceding clauses, characterized in that the second fuel is a high octane fuel.

11. A method according to any one of the preceding clauses, characterized in that the second fuel has a Research Octane Number (RON) of at least 80.

12. A method according to any one of the preceding clauses, characterized in that the injection (S5, I2) of the second fuel is provided at the end of the first power stroke (PS1) or in the second compression stroke (CS2).

13. A method according to any one of the preceding clauses, characterized in that the injection (S5, I2) of the second fuel is provided at the end of the first power stroke (PS1) or at the beginning of the second compression stroke (CS2).

14. A method according to any one of the preceding clauses, characterized in that the injection (S5, I2) of the second fuel is provided before 90 crankshaft degrees before the top dead center (TDC) position at the end of the second compression stroke (CS2).

15. A method according to any one of the preceding clauses, characterized in that the injection (S5, I2) of the second fuel is provided after the bottom dead center (BDC) position at the beginning of the second compression stroke (CS2).

16. A method according to any one of the preceding clauses, characterized by determining (S8) an amount of oxygen in exhaust gases produced by the second combustion, and determining based on the determined amount of oxygen an amount of second fuel, whereby the amount of second fuel injected (S5, I2) is said determined amount.

17. A method according to any one of the preceding clauses, characterized by expelling (S7) exhaust gases produced by the second combustion from the cylinder (3) during an exhaust stroke (ES) succeeding the second power stroke (PS2), and allowing the exhaust gases to be guided to a three-way catalyst (9).

18. A method according to any one of the preceding clauses, characterized in that said oxygen in the residues is at least partly provided as a part of nitrogen oxide (NOx) in the residues.

19. A method according to any one of the preceding clauses, characterized by adjusting a compression ratio of the second compression stroke (CS2).

20. A method according to clause 19, where the engine comprises an intake manifold (5) for guiding air to the cylinder (3), an exhaust guide (6) for guiding gases from the cylinder (3), and a valve (501, 601) for controlling a communication between the cylinder (3) and the exhaust guide (6) or the intake manifold (5), the method comprising providing said compression ratio adjustment by adjusting an overlap of an opening sequence (BOS) of the valve (501, 601) and the second compression stroke (CS2).

21. A method according to clause 20, where the engine comprises a camshaft (502, 602) with a cam lobe (503, 603) for actuating the valve (501, 601), the method comprising adjusting the overlap by cam phasing of the camshaft (502, 602).

22. A method according to any one of clauses 19-21, characterized by determining a requested load of the engine, the adjustment of said compression ratio being at least partly based on the requested engine load.

23. A method according to any one of the preceding clauses, where the engine comprises an exhaust guide (6) arranged to guide gases from the cylinder (3) to an exhaust treatment device (9), the method comprising determining a requested load of the engine, determining a temperature of the exhaust treatment device (9), and determining based on the determined temperature whether to operate the engine at the requested load in a first mode or a second mode, the amount of first fuel injected (I1) for the first combustion being smaller in the second mode than in the first mode, and/or the amount of second fuel injected (I2) for the second combustion being larger in the second mode than in the first mode.

24. A method according to clause 23, where the engine is provided with a valve (601) for controlling a communication between the cylinder (3) and the exhaust guide (6), the method comprising controlling an overlap of an opening sequence (EOS) of the valve (601) and the second power stroke (PS2) to be larger in the second mode than in the first mode.

25. A method according to clause 24, where the engine comprises a camshaft (602) with a cam lobe (605) for actuating the valve (601), the method comprising controlling the overlap by cam phasing of the camshaft (602).

26. A computer program comprising program code means for performing the steps of any one of clauses 1-25 when said program is run on a computer.

27. A computer readable medium carrying a computer program comprising program code means for performing the steps of any one of clauses 1-25 when said program product is run on a computer.

28. A control unit configured to perform the steps of the method according to any one of clauses 1-25.

29. An internal combustion engine system comprising a cylinder (3) with a piston (301) connected to a crankshaft (4), an intake manifold (5) arranged to guide air to the cylinder (3), an exhaust guide (6) arranged to guide gases from the cylinder (3), a first container (701), a first injector (702) arranged to inject a first fuel supplied from the first container (701) into the cylinder (3), a second container (802), and a second injector (802) arranged to inject a second fuel supplied from the second container (802) into the cylinder (3), the system being arranged to provide a six-stroke cycle with a sequence of a first compression stroke (CS1), a first power stroke (PS1), a second compression stroke (CS2) and a second power stroke (PS2), characterized in that the system comprises a three-way catalyst (9), the exhaust guide (6) being arranged to guide gases from the cylinder (3) to the three-way catalyst (9).

30. A system according to clause 29, characterized in that the system comprises means (211) for determining an amount of oxygen in exhaust gases produced by the second combustion.

31. A system according to clause 30, characterized in that the means for determining an amount of oxygen comprises lambda sensor (211).

32. A system according to any one of clauses 29-31, characterized in that the system comprises an intake valve (501) and an exhaust valve (601) arranged to control a communication between the cylinder (3) and the intake manifold (5) and a communication between the cylinder (3) and the exhaust guide (6), respectively, the system further comprising a valve actuation assembly (502, 602, 503, 603, 506, 606) arranged to adjust an overlap of an opening sequence (BOS) of the intake valve (501) and/or the exhaust vale (601) and the second compression stroke (CS2).

33. A system according to clause 32, characterized in that the valve actuation assembly comprises at least one camshaft (502, 602) with an intake cam lobe (503) for actuating the intake valve (501) and an exhaust cam lobe (603) for actuating the exhaust valve (601), the camshaft (502, 602) being arranged to rotate at a speed being a third of the rotational speed of the crankshaft (4), the camshaft (502, 602) being arranged for a cam phasing function, the intake cam lobe (503) and/or the exhaust cam lobe (603) being provided with a nose (604) for providing the opening sequence (BOS) of the intake valve (501) and/or the exhaust valve (601), respectively, whereby the cam phasing function is arranged to adjust the overlap of the opening sequence (BOS) and the second compression stroke (CS2).

34. A system according to any one of clauses 29-33, characterized in that the system tither comprises an exhaust valve (601) arranged to control a communication between the cylinder (3) and the exhaust guide (6), and a valve actuation assembly (602, 603, 606) arranged to adjust an overlap of an opening sequence (EOS) of the exhaust valve (601), and the second power stroke (PS2).

35. A system according to clause 34, characterized in that the valve actuation assembly comprises at least one camshaft (502, 602) with an exhaust cam lobe (603) for actuating the exhaust valve (601), the camshaft (502, 602) being arranged to rotate at a speed being a third of the rotational speed of the crankshaft (4), the camshaft (502, 602) being arranged for a cam phasing function, the exhaust cam lobe (603) being provided with a nose (605) for providing the opening sequence (EOS) of the exhaust valve (601), whereby the cam phasing function is arranged to adjust the overlap of the opening sequence (EOS) and the second power stroke (PS2).

36. A system according to any one of clauses 29-35, characterized in that the first fuel is diesel fuel, the system comprising a fuel reforming assembly (20) arranged to crack the diesel fuel from the first container (701) to produce the second fuel in the form of gasoline, the second container (802) being arranged to receive the gasoline from the fuel reforming assembly (20).

37. A vehicle with an internal combustion engine system according to any one of clauses 29-36.

The invention claimed is:

1. A method for operating an internal combustion piston engine, comprising introducing air into a cylinder of the engine, compressing the air in a first compression stroke of the cylinder, providing fuel into the cylinder for a first combustion, with a portion of the oxygen in the compressed air as oxidant, in a first power stroke succeeding the first compression stroke, to produce residues including oxygen, compressing the residues in a second compression stroke succeeding the first power stroke, and providing, after the first combustion, fuel into the cylinder for a second combustion, with at least a portion of the oxygen of the residues as oxidant, in a second power stroke succeeding the second compression stroke, wherein the first combustion is a diffusion combustion provided by a compression ignition, wherein the first compression stroke is repeated immediately after the second power stroke, and the introduction of air into the cylinder is done at the end of the second power stroke and/or at the beginning of the first compression stroke, the method comprising controlling the amount of fuel provided for the second combustion so as for the second combustion to be a stoichiometric combustion, wherein the method comprises preventing the introduction of air into the cylinder between the first and second combustions, and wherein the engine is a crankcase-scavenged engine wherein an intake guide is arranged to guide air to the cylinder from a crankcase of the engine, wherein an air conduit is arranged to guide air to the crankcase, wherein preventing the introduction of air into the cylinder bet the first and second combustions comprises controlling flow control means for the air conduit to allow air to escape the crankcase during the first power stroke.

2. A method according to claim 1, wherein a scavenging process is provided in the cylinder at the end of the second power stroke and/or at the beginning of the repeated first compression stroke.

3. A method according to claim 1, wherein the fuel provided for the first combustion is a first fuel and the fuel provided for the second combustions is a second fuel of a type which is different from that of the first fuel.

4. A method according to claim 1, wherein the fuel provided for the first combustion is injected into the air when at least a major portion of the first compression stroke has been completed.

5. A computer comprising a computer program for performing the steps of claim 1 when the program is run on the computer.

6. A non-transitory computer readable medium carrying a computer program for performing the steps of claim 1 when the program product is run on a computer.

7. A control unit configured to perform the steps of the method according to claim 1.

8. A method for operating an internal combustion piston engine, comprising introducing air into a cylinder of the engine, compressing the air in a first compression stroke of the cylinder, providing fuel into the cylinder for a first combustion, with a portion of the oxygen in the compressed air as oxidant, in a first power stroke succeeding the first compression stroke, to produce residues including oxygen, compressing the residues in a second compression stroke succeeding the first power stroke, and providing, after the first combustion, fuel into the cylinder for a second combustion, wherein the fuel provided for the first combustion is diesel fuel and the fuel provided for the second combustion is a second fuel of a type which is different from that of the first fuel, with at least a portion of the oxygen of the residues as oxidant, in a second power stroke succeeding the second compression stroke, wherein the first combustion is a diffusion combustion provided by a compression ignition, wherein the first compression stroke is repeated immediately after the second power stroke, and the introduction of air into the cylinder is done at the end of the second power stroke and/or at the beginning of the first compression stroke, the method comprising controlling the amount of fuel provided for the second combustion so as for the second combustion to be a stoichiometric combustion, wherein the method comprises supplying the diesel fuel for the injection thereof from a container, and reforming diesel fuel from the container to produce the second fuel in the form of gasoline.

9. A method according to claim 8, the method comprising controlling the temperature of the residues by controlling the timing of the injection of the first fuel, and/or by controlling the amount of the first fuel injected at the injection of the first fuel.

10. A method according to claim 8, wherein the injection of the second fuel is provided before 90 crankshaft degrees before the top dead center position at the end of the second compression stroke.

11. A method according to claim 8, comprising providing a compression ratio of the second compression stroke which is lower than a compression ratio of the first compression stroke.

12. A method according to claim 11, where the engine comprises an intake guide for guiding air to the cylinder, an exhaust guide for guiding gases from the cylinder and a valve for controlling a communication between the cylinder and the exhaust guide or the intake guide, the method comprising providing the compression ratio difference by providing an overlap of an opening sequence of the valve and the second compression stroke.

13. A computer comprising a computer program for performing the steps of claim 8 when the program is run on the computer.

14. A non-transitory computer readable medium carrying a computer program for performing the steps of claim 8 when the program product is run on a computer.

15. A control unit configured to perform the steps of the method according to claim 8.

16. A method for operating an internal combustion piston engine, comprising introducing air into a cylinder of the engine, compressing the air in a first compression stroke of the cylinder, providing fuel into the cylinder for a first combustion, with a portion of the oxygen in the compressed air as oxidant, in a first power stroke succeeding the first compression stroke, to produce residues including oxygen, compressing the residues in a second compression stroke succeeding the first power stroke, and providing, after the first combustion, fuel into the cylinder for a second combustion, with at least a portion of the oxygen of the residues as oxidant, in a second power stroke succeeding the second compression stroke, wherein the first combustion is a diffusion combustion provided by a compression ignition, wherein the first compression stroke is repeated immediately after the second power stroke, and the introduction of air into the cylinder is done at the end of the second power stroke and/or at the beginning of the first compression stroke, the method comprising controlling the amount of fuel provided for the second combustion so as for the second combustion to be a stoichiometric combustion, where the engine comprises an exhaust guide arranged to guide gases from the cylinder to an exhaust treatment device, the fuel provided for the first combustion being a first fuel and the fuel provided for the second combustion being a second fuel, the method comprising determining a requested load of the engine, determining a temperature of the exhaust treatment device, and determining based on the determined temperature whether to operate the engine at the requested load in a first mode or a second mode, the amount of first fuel provided for the first combustion being smaller in the second mode than in the first mode, and/or the amount of second fuel provided for the second combustion being larger in the second mode than in the first mode.

17. A method according to claim 16, where the engine is provided with a valve for controlling a communication between the cylinder and the exhaust guide, the method comprising controlling an overlap of an opening sequence of the valve and the second power stroke to be larger in the second mode than in the first mode.

18. A computer comprising a computer program for performing the steps of claim 16 when the program is run on the computer.

19. A non-transitory computer readable medium carrying a computer program for performing the steps of claim 16 when the program product is run on a computer.

20. A control unit configured to perform the steps of the method according to claim 16.

* * * * *